(12) United States Patent
Pandana et al.

(10) Patent No.: US 9,135,950 B1
(45) Date of Patent: Sep. 15, 2015

(54) OPTICAL DISC DRIVE HIGH FREQUENCY MODULATION SIGNAL DETECTION

(71) Applicant: Marvell International Ltd., Hamilton (BM)

(72) Inventors: Charles Pandana, Fremont, CA (US); Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/622,179

(22) Filed: Feb. 13, 2015

Related U.S. Application Data

(63) Continuation of application No. 14/068,963, filed on Oct. 31, 2013, now Pat. No. 8,958,276.

(60) Provisional application No. 61/720,759, filed on Oct. 31, 2012.

(51) Int. Cl.
*G11B 20/10* (2006.01)
*G11B 20/18* (2006.01)

(52) U.S. Cl.
CPC .................. *G11B 20/10222* (2013.01)

(58) Field of Classification Search
None
See application file for complete search history.

(56) References Cited

U.S. PATENT DOCUMENTS

| | | |
|---|---|---|
| 4,146,743 A | 3/1979 | Raynham |
| 4,466,089 A | 8/1984 | Wachi |
| 4,628,497 A | 12/1986 | Bierhoff |
| 4,734,900 A | 3/1988 | Davie |
| 4,740,940 A | 4/1988 | Tanaka et al. |
| 4,864,553 A | 9/1989 | Sakakibara et al. |
| RE33,665 E | 8/1991 | Ogawa |
| 5,170,387 A | 12/1992 | Groen |
| 5,475,664 A | 12/1995 | Shimizume et al. |
| 6,072,756 A | 6/2000 | Shigenobu |
| 6,175,542 B1 | 1/2001 | Okada et al. |
| 6,233,219 B1 | 5/2001 | Hori et al. |
| 6,260,146 B1 * | 7/2001 | Mos et al. ............. 713/176 |
| 6,377,525 B1 | 4/2002 | Iida |
| 7,257,059 B2 | 8/2007 | Kaneshige |
| 8,000,193 B1 | 8/2011 | Liu et al. |
| 8,050,157 B1 | 11/2011 | Liu |
| 8,958,276 B1 * | 2/2015 | Pandana et al. ........... 369/59.19 |
| 2001/0040846 A1 | 11/2001 | Kawashima et al. |
| 2003/0081524 A1 | 5/2003 | Wada et al. |
| 2003/0227853 A1 | 12/2003 | Kim et al. |
| 2004/0125731 A1 | 7/2004 | Park |
| 2004/0168075 A1 | 8/2004 | Suh et al. |
| 2005/0078585 A1 | 4/2005 | Wang |

(Continued)

FOREIGN PATENT DOCUMENTS

| | | |
|---|---|---|
| WO | WO-2004/017311 A1 | 2/2004 |
| WO | WO-2004/066285 A1 | 8/2004 |
| WO | WO-2004/107342 A1 | 12/2004 |

*Primary Examiner* — Peter Vincent Agustin

(57) ABSTRACT

A plurality of time periods corresponding to times at which a predicted transition in a signal is expected to occur are determined. The signal has bi-phase modulation, and the predicted transition corresponds to a transition in the signal from a first state to a second state as part of the bi-phase modulation. A next transition in the signal from the first state to the second state is detected, and it is determined whether the detected next transition occurred during one of the plurality of time periods. In response to determining that the detected next transition occurred during one of the plurality of time periods, a timing of the detected next transition is used to adjust a clock used for recovering channel bits in the signal.

20 Claims, 20 Drawing Sheets

(56) References Cited

U.S. PATENT DOCUMENTS

| | | |
|---|---|---|
| 2005/0226114 A1 | 10/2005 | Liow et al. |
| 2005/0232105 A1 | 10/2005 | Konagai et al. |
| 2006/0034388 A1 | 2/2006 | Mizuguchi et al. |
| 2006/0072396 A1 | 4/2006 | Richter et al. |
| 2006/0109756 A1 | 5/2006 | Chen et al. |
| 2006/0120244 A1* | 6/2006 | Miyauchi et al. .......... 369/59.22 |
| 2006/0250915 A1 | 11/2006 | Park |
| 2006/0250918 A1 | 11/2006 | Hsu et al. |
| 2006/0285453 A1* | 12/2006 | Kuo et al. .................... 369/47.3 |
| 2006/0291343 A1 | 12/2006 | Ballweg |
| 2008/0008062 A1* | 1/2008 | Rees et al. .................. 369/47.1 |
| 2008/0043583 A1* | 2/2008 | Hamre et al. ............... 369/44.28 |
| 2008/0101176 A1 | 5/2008 | Mouri et al. |

* cited by examiner

OPTICAL DISC DRIVE HIGH FREQUENCY MODULATION SIGNAL DETECTION

CROSS-REFERENCE TO RELATED APPLICATIONS

This application is a continuation of U.S. patent application Ser. No. 14/068,963, now U.S. Pat. No. 8,958,276, filed on Oct. 31, 2013, which claims the benefit of U.S. Provisional Patent Application No. 61/720,759, entitled "HFM Detection Circuit for Low NA Fixed Collimator System," filed on Oct. 31, 2012. Both of the applications referenced above are hereby incorporated by reference herein in their entireties.

FIELD OF THE TECHNOLOGY

The disclosure relates generally to non-volatile optical medium storage devices and, more particularly, to techniques for timing recovery and decoding of a high frequency modulation (HFM) signal in an optical disc drive system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.
Nonvolatile optical data storage systems include compact disc (CD) systems, digital versatile disc (DVD) systems and, more recently, Blu-ray Disc (BD) and Blu-ray Disc XL (BDXL) systems. An optical data storage control system generally includes a buffer that stores read data, write data and/or volatile control code that is associated with the control of the system. Flash memory can also be used for critical data such as data relating to write formats and/or other nonvolatile control code. The optical data storage control system may also include a microprocessor of a computing system such as a server, a personal computer, a personal digital assistant (PDA), etc., or of a consumer electronics device such as a gaming system, etc., to allow the microprocessor to store data to and read data from the optical disc. The microprocessor may perform data and/or control processing that is related to the operation of the system. The microprocessor also performs decoding of copy protection and/or compression/decompression as needed. An input/output interface receives data to be written to the optical disc and transmits data read from the optical disc. A control module communicates with the input/output interface and with a spindle/feed motor (FM) driver and/or a read/write channel (RWC) device. The control module coordinates control of the spindle/FM driver, an actuator controller, the read/write channel device and the microprocessor and data input/output via the interface. Additionally, the RWC device may be coupled to the actuator controller. The RWC device may include a read channel device.

An optical data storage assembly includes an optical platter or disc that stores data optically. During write operations, the read/write channel module encodes the data to be written by an optical read/write device, such as an optical pick-up unit (OPU). During read operations, the read/write channel module converts an analog output of the OPU device to a digital signal. The converted signal is then detected and decoded by known techniques to recover the data that was written on the optical disc.

The optical disc is rotated by a spindle motor at a controlled and/or variable speed during the read/write operations. The OPU device moves relative to the disc to read and/or write data to/from the disc. The OPU may be attached to a sled, and a motor may be used to control position the sled over the optical disc.

The OPU device typically includes a laser and an optical sensor. For read/write and read only systems, the laser is directed at tracks on the disc that contain lands and pits during read operations. The optical sensor senses reflections caused by the lands/pits. The spindle/FM driver controls the spindle motor, which controllably rotates the disc. The spindle/FM driver also generates control signals that position the feed motor, for example using a voice coil actuator, a stepper motor or any other suitable actuator. The feed motor typically moves the OPU device radially relative to the disc. A laser driver generates a laser drive signal based on an output of the read/write channel module.

Portions of the optical data storage system may be implemented by one or more integrated circuits (IC) or chips. For example, the microprocessor and the control module may be implemented by a single chip. The spindle/FM driver and/or the read/write channel module may also be implemented by the same chip as the microprocessor, the control module and/or by additional chips.

The optical disc stores digitally encoded data as a series of marks separated by small spaces. The OPU reads the marks to recover the data encoded in the marks.

Recovering and matching the timing of the signal from the optical disc is one area in which errors in reading and decoding data may occur, particularly with high frequency modulated (HFM) data.

SUMMARY OF THE DISCLOSURE

In an embodiment, a method includes determining a plurality of time periods corresponding to times at which a predicted transition in a signal is expected to occur, wherein the signal has bi-phase modulation, and the predicted transition corresponds to a transition in the signal from a first state to a second state as part of the bi-phase modulation. The method also includes detecting a next transition in the signal from the first state to the second state, and determining whether the detected next transition occurred during one of the plurality of time periods. The method further includes using a timing of the detected next transition to adjust a clock used for recovering channel bits in the signal in response to determining that the detected next transition occurred during one of the plurality of time periods.

In another embodiment, an apparatus comprises a clock generation device configured to generate a clock, and a bit recovery device configured to process samples of a signal to recover a sequence of channel bits from the signal using the clock, wherein the signal has bi-phase modulation. The apparatus also comprises a timing recovery device configured to determine a plurality of time periods corresponding to times at which a predicted transition in the signal is expected to occur, wherein the predicted transition corresponds to a transition in the signal from a first state to a second state as part of the bi-phase modulation, detect a next transition in the signal from the first state to the second state, determine whether the detected next transition occurred during one of the plurality of time periods, and in response to determining that the detected next transition occurred during one of the plurality of time periods, cause the clock generation device to adjust the clock based on a timing of the detected next transition.

DETAILED DESCRIPTION

While the HFM detection and timing recovery technique described herein are disclosed as being used in optical drive systems that use one or more Blu-Ray Disc format specifications (e.g., Blu-ray Disc Rewritable Format Version 1.0; Rewritable (BD-RE) Formats RE 1.x, RE 2.x, RE 3.x; Recordable (BD-R) Formats R 1.x, R 2.x; Read-Only (BD-ROM) Format ROM 1.x; Blu-ray Disc XL (BDXL) formats, and AVCREC), these techniques are used in various other types of optical drive systems that utilize high frequency modulation and are not limited to those conforming to one or more of the Blu-Ray Disc format specifications in other embodiments.

Figure 1:
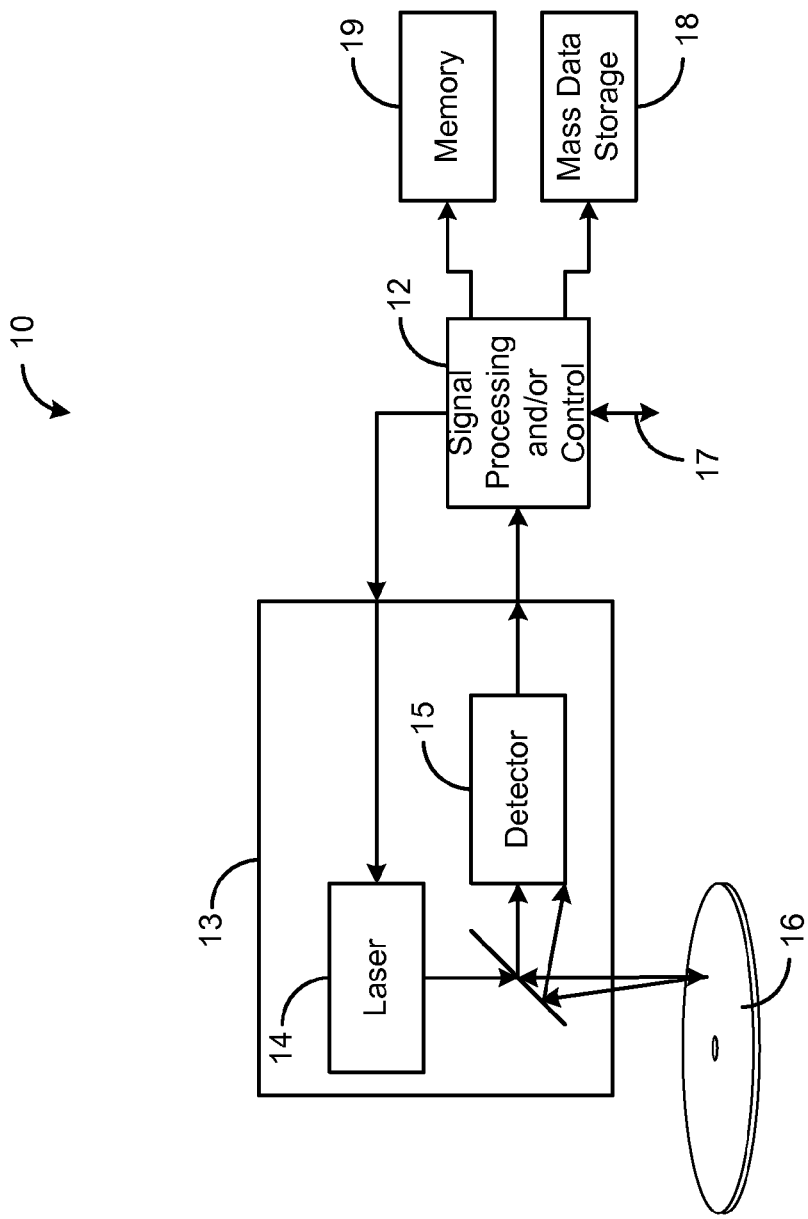
FIG. 1 is a block diagram of an example Blu-ray optical disc drive system to read data from a Blu-ray Disc, according to an embodiment.

Referring now to FIG. 1, an optical data storage system 10 is shown, which, in particular, is provided as a Blu-ray optical data storage system 10. In an embodiment, the optical data storage system 10 is a part of a Blu-Ray digital versatile disc (DVD) drive, such as found in a DVD player, a DVD drive of a personal computer or laptop computer, or any of a number of devices and appliances that use DVD drives generally and/or Blu-Ray optical disc drives in particular. As described further below, according to an embodiment, the timing recovery and decoding techniques are implemented by either or both signal processing and/or control units, which are generally identified in FIG. 1 at block 12, and/or a mass data storage 18 of optical data storage system 10. In various embodiments and/or scenarios, the signal processing and/or control unit 12 and/or other units (not shown) in the optical data storage system 10 process data, perform encoding, decoding and/or encryption, perform calculations, and/or format data that is read from and/or data written to an optical storage medium 16, such as a Blu-Ray Disc.

According to an embodiment, data is read from and/or written to the optical storage medium 16 using an optical pickup unit (OPU) 13. Generally, the optical pickup unit 13 includes a laser 14, such as a laser diode, laser diode array or other laser assembly, and a detector 15, such as a photodiode detector or other opto-electronic sensor. The electronics in the drive interpret the changes in reflectivity in order to read the bits that make up the bytes. In some embodiments, the optical pickup head assembly 13 includes a laser driver (not shown) which is integrated with the laser 14 or is provided externally to the laser 14. If the optical data storage system 10 is implemented as a Blu-Ray optical disc drive system, the laser 14 emission has a wavelength of 405 nanometers.

In an embodiment, the laser 14 is controlled by the signal processing and/or control 17 to write data to the optical storage medium 16 and/or to read data from the optical storage medium 16 by focusing the laser emission on the optical storage medium 16 using a lens or lens assembly (not shown). In the example of a Blu-Ray Disc and other optical discs, the laser light is focused on a single, continuous spiral groove or track of the optical storage medium 16, which runs from the center of the disc to the edge of the disc. The light emission reflects off of microscopic wobble paths (microscopic bumps and lands) formed within the groove of the spiral track. The reflection off the bumps is different than that off the lands, and the detector 15 detects the changes in reflection as a readback signal.

According to an embodiment, the readback signal from the detector 15 is interpreted and processed by the signal processing and/or control unit 12 as bits and bytes of data. Specifically, the signal processing and/or control unit 12 samples the readback signal according to the timing, T, of the signal. That is, the signal processing and/or control unit 12 accounts for the rotation (spindle) speed of the optical storage medium 16, which corresponds the timing of the signal received by the optical data storage system 10. Due to jitter from the rotation of the optical storage medium 16, the rotation speed may vary and/or the rotation of the optical storage medium 16 may be off-center, thereby resulting in an elliptical rotation, rather than a circular rotation. In an embodiment, the signal processing and/or control unit 12 accounts for the off-center rotation using radial tracking to prevent track skipping (i.e., prevent the laser focus from skipping over the spiral track instead of along the spiral track). Even with radial tracking and constant spindle speed, the timing of the signal may appear to vary depending on the radius of the groove. For example, in various embodiments and/or situations the signal timing appears slower when reading from a groove location having a smaller radius (e.g., towards the center of the disc), and appears faster when reading a from groove location having a larger radius (e.g., towards the outer edge of the disc). In an embodiment, the signal processing and/or control unit 12 recovers the timing of the signal in order to properly decode the data. In some implementations, the signal processing and/or control unit 12 and/or other circuits (not shown) in the optical data storage system 10 also performs other functions such as encoding and/or decoding and/or any other signal processing functions associated with an optical disc drive. As discussed in further detail below, one of these functions includes the disclosed HFM timing recovery and decoding techniques, in embodiments.

In some embodiments, the optical pickup unit 13 includes an adjustable collimator (not shown) movable to various positions for collimating the light emissions which generally improves the quality of the light signal, for example by reducing noise in the signal as the signal is read by the detector 15, in at least some situations. Additionally, in some embodiments, the OPU 13 includes an objective lens, such as a high numerical aperture lens, for focusing the light emissions detected by the detector 15. On the other hand, in other embodiments, the optical pickup unit 13 includes a fixed, rather than adjustable, collimator, for example to reduce the cost of the optical pickup unit 13. Additionally, in some embodiments, the OPU 13 includes a reduced numerical aperture (NA) lens. In such embodiments, the fixed collimator and/or the reduced numerical aperture of the lens result in a lower quality of the readback signal detected by the detector 15. For example, a fixed collimator and/or reduced numerical aperture lens in the OPU 13 degrades timing recovery performance of the detector 15 due to spreading of samples in the readback signal leading to more errors in the signal detected by the detector 15. Also, the fixed collimator and reduced numerical aperture in the OPU 13 results in lower amplitude of the readback signal, thereby reducing detection margin in the readback signal seen by the detector 15 (e.g., signal above zero and/or below zero for a shorter period of time), in at least some situations. In various embodiments, timing recovery and decoding techniques of the present disclosure allow the signal processing and/or control unit 12 to read the HFM signal and to recover HFM data from the HFM signal accurately and reliably even when operating with degraded and noisy readback signal of the detector 15, such as in embodiments in which the OPU 13 includes a fixed collimator and/or a reduced aperture lens, in at least some situations.

In some embodiments, the optical data storage system 10 is configured to communicate with an output device (not shown) such as a computer, television or other device via one or more wired or wireless communication links 17. As illustrated in FIG. 1, the optical data storage system 10 communicates with the mass data storage 18 that stores data in a nonvolatile manner. In an embodiment, the mass data storage 18 includes a hard disk drive (HDD). The optical data storage system 10 is connected to memory 19, such as RAM, ROM, low latency nonvolatile memory such as flash memory, and/or other suitable electronic data storage, in an embodiment.

The structure of the optical storage medium 16, in the example of a Blu-Ray Disc, includes various areas or zones on the disc, including a clamping area, a transition area, an information area, and an outer rim area, which are arranged from the center of the disc to the edge of the disc, respectively. The clamping area, transition area and outer rim area are well-known to those of ordinary skill in the art, and need not be described further herein.

The information area is formatted into a burst-cutting area (BCA) and an information zone. The information zone is divided into three parts: the lead-in zone, the data zone and the lead-out zone, arranged in a direction from the center of the disc towards the edge of the disc, respectively. The lead-in zone, in turn, includes various parts, such as a first guard/protection zone, a permanent information and control (PIC) data zone, a second guard/protection zone, an information zone, an optimum power calibration (OPC) zone, a reserved zone and a second information zone, again arranged in a direction from the center of the disc towards the edge of the disc, respectively, in at least some embodiments. The lead-out zone includes various parts, such as a disc information zone and a guard/protection zone, arranged in a direction from the center of the disc to the edge of the disc, respectively, in at least some embodiments. The lead-out is be used for rewriteable data, in the case of a rewriteable disc (e.g., BD-RE), in some such embodiments.

The data area between the lead-in and lead-out areas is generally reserved for the user data, such as audio/visual data in the case of a Blu-Ray DVD. The user data is recorded in the data area in tracks of wobbled grooves. That is, data recorded in the data area is aligned and recorded in standard wobble-shaped grooves. The wobble grooves of the data area are generally understood by those of ordinary skill in the art, and need not be described further herein.

The lead-in area contains embossed high frequency modulation (HFM) grooves and rewritable (i.e., tracks of wobbled grooves) control information, and an area for disc and drive testing. When reading the HFM groove, the optical pickup head assembly 13 generates an HFM signal from the reflections off the bumps and lands of the wobble groove. In one example, the HFM signal is a groove signal carried by a radial push-pull (RPP) signal, which controls the radial position of the optical pickup head assembly. Because HFM is a groove signal, the analog path for detection of the HFM is similar to that of an RPP or wobble signal, which uses a rectangular or square-wave modulation, rather than sinusoidal modulation. An RPP signal is known by those of ordinary skill in the art and need not be described further herein.

The data in the HFM grooves is recorded in 4000 partitions in the PIC data area, and the partitions are referred to as PIC clusters. Generally, the data in the HFM grooves provides the error correction code (ECC) information for the HFM blocks. In particular, the data in the PIC data area includes the important permanent disc information encoded in the HFM wobbled groove. For example, in various embodiments, the PIC data area includes all of the necessary writing information to be used by the host, such as writing power, disc information, etc., which is encoded by HFM. Accordingly, the HFM signal is read and decoded, with the information sent to the host, so that the host may use the information in its own writing processes.

As disclosed further below, the wobble-shaped encoding involves bi-phase modulation, whereby channel bits are encoded by deviating the HFM groove from the average groove center. In bi-phase modulation, the groove is partitioned into bit cells of 36T (i.e., the length of the bit cell), where T corresponds to the channel clock or timing of the HFM signal. As discussed above with respect to the signal processing and/or control unit 12, the readback signal from the detector 15, which corresponds to the HFM signal when reading an HFM groove, is sampled according to the timing, T, of the signal. The HFM detection and timing recovery techniques provide a mechanism to recover the signal timing, T, and the signal processing and/or control unit 12 uses this signal timing to read and decode the data from the HFM signal. It should be understood by those of ordinary skill in the art that while the bit cell lengths are often standardized such that the disc may be used with different optical disc drive systems, bit cell lengths different than 36T are utilized, in some embodiments, without affecting the HFM detection and timing recovery technique described herein.

Figure 2:
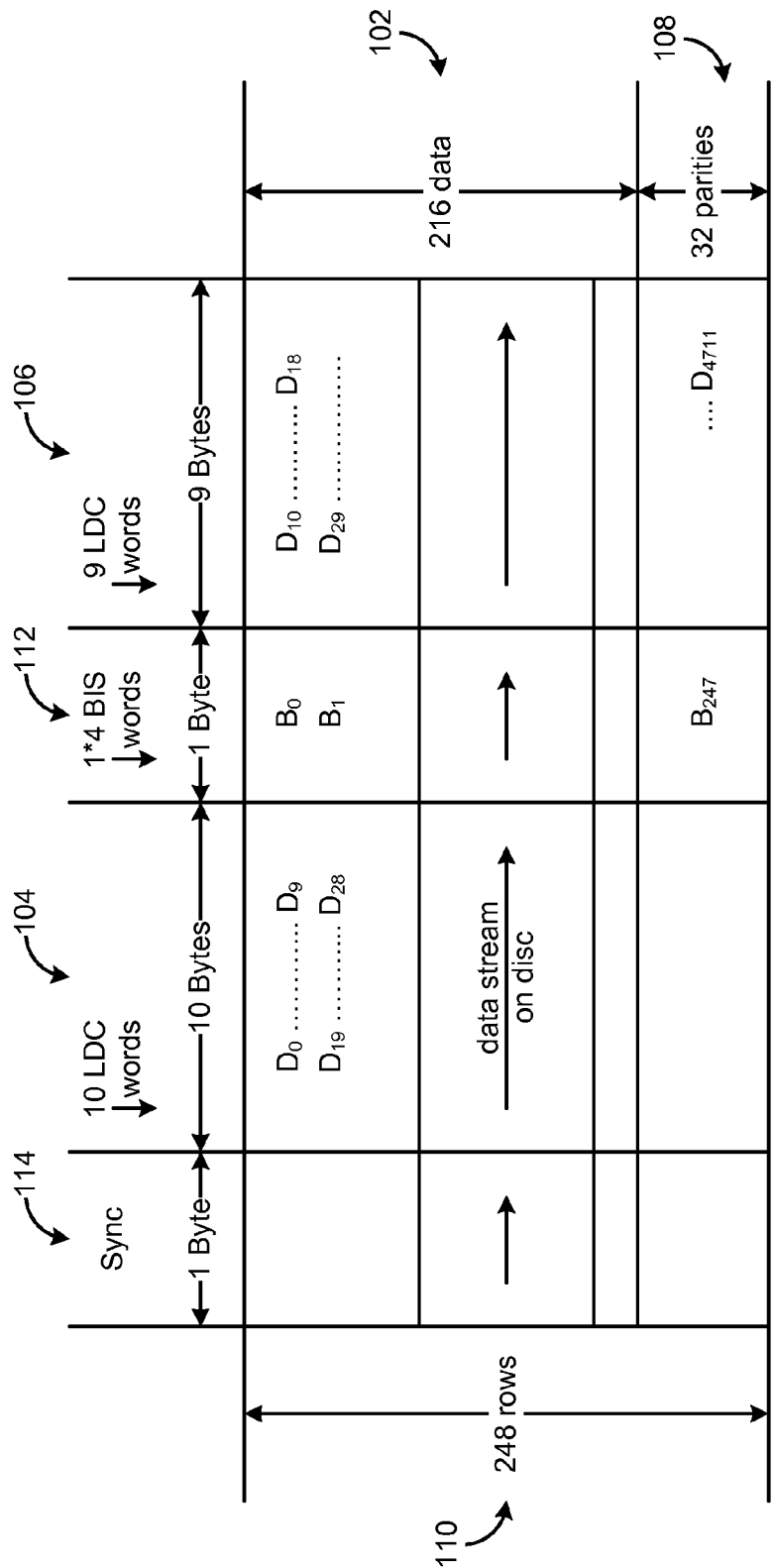
FIG. 2 is a schematic diagram of a data structure in a permanent information and control (PIC) cluster of a Blu-ray Disc, according to an embodiment.

In an embodiment, each PIC cluster contains two data frames, each with 2048 bytes of data. FIG. 2 is an example of a data structure in a permanent information and control (PIC) cluster of a Blu-ray Disc, according to an embodiment. Referring to FIG. 2, each data frame is extended with a 4-byte error detection code (EDC) and scrambled. The two scrambled data frames are mapped into a data block of 216 rows 102 by nineteen 1-byte columns 104, 106 ($D_0 \ldots D_9$, $D_{10} \ldots D_{18}, \ldots$) and transformed into a long distance code (LDC) block by adding 32 parity rows 108 for error correction coding. Address and control data for the PIC are reordered into a burst-indicating subcode (BIS) cluster of 248 rows 110 by a single 1-byte column 112. The PIC cluster is obtained by multiplexing an LDC block and a BIS cluster. Each PIC recording frame is converted into modulated bits by applying bi-phase modulation.

Figure 3:
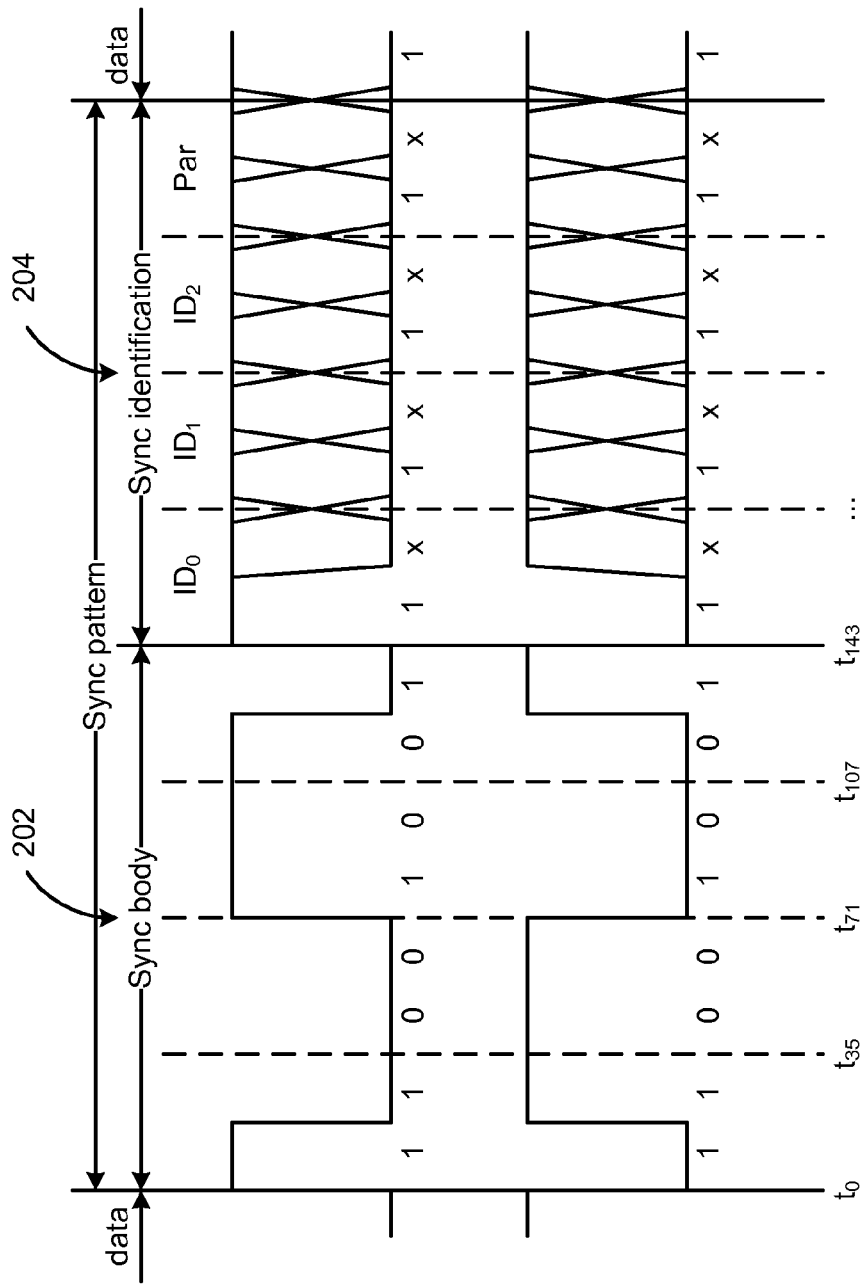
FIG. 3 is a schematic diagram of a synchronization pattern in a PIC cluster of a Blu-ray Disc, according to an embodiment.

Also contained within the PIC cluster are synchronization patterns ordered into a block of 248 rows 110 by a single 1-byte column 114, which precedes each frame in the PIC cluster, in at least some embodiments. FIG. 3 is a schematic diagram of a bi-phase synchronization pattern used in the PIC cluster of FIG. 2, according to an embodiment. Referring to FIG. 3, the synchronization pattern includes a synchronization body 202 and a synchronization identification 204. Keeping with the description of bi-phase modulation, the synchronization pattern is partitioned into eight bit cells of length 36T. However, in this synchronization pattern, only the synchronization identification 204 signal is bi-phase modulated. A brief description of bi-phase modulation is provided further below.

The synchronization body 202 is provided as a predetermined synchronization data pattern, in this case an 8 channel bit data pattern of "11001001," with each channel bit corresponding to a transition in the HFM wobble groove of the synchronization pattern provided on the disc. That is, when the pickup head 13 of the optical data storage system 10 scans the HFM wobble groove corresponding to the synchronization body 202, the reflection angle of the light reflection off the groove will vary according to the deviations (bumps/lands) from the centerline of the groove, where each variation in reflection angle corresponds to a signal transition. The detector 15 detects these signal transitions by detecting the difference in the reflection angle, for example, by detecting changes in the phase or intensity of the light reflection from disc's surface. The light reflection detected by the detector 15 is provided as an analog signal or waveform corresponding to the wobble groove (e.g., analog wobble path). The optical data storage system 10 interprets these signal transitions according to channel bits.

In the synchronization body 202, a channel bit value "1" is represented by a signal transition in the waveform as compared to the waveform of the preceding channel bit, and a channel bit value "0" is represented by no signal transition in the waveform as compared to the waveform of the preceding channel bit. For example, as seen in FIG. 3, the waveform corresponding to the first channel bit (e.g., high) begins with a signal transition as compared to the waveform corresponding to the previous channel bit (e.g., low), thereby providing a first channel bit of "1" for the synchronization data pattern due to the signal transition. The waveform (high) then transitions in the next channel bit (low), thereby providing a second channel bit of "1." The waveform for the channel bit thereafter (low) does not involve a signal transition, so the third channel bit is "0." The synchronization waveform continues with signal transitions or no signal transitions according to the wobble groove and waveform corresponding to the synchronization data pattern "11001001." As seen in FIG. 3, the lower waveform is a mirrored version of the upper waveform, but the signal transitions result in the same synchronization data pattern. This predetermined synchronization data pattern and waveforms are recognized by the optical data storage system 10, which reads and interprets the synchronization body as the beginning of the PIC data frame. The HFM detection and timing techniques include examples of how the optical data storage system 10 can detect the synchronization data pattern.

As noted above, unlike the synchronization identification 204, the synchronization body 202 is generally not bi-phase modulated. Instead, in order for the optical data storage system 10 to find the synchronization pattern, the waveform read from the detector 15 is decoded and interpreted by the optical data storage system 10 according to the channel bit information, and not the bi-phase modulated data.

On the other hand, the synchronization identification 204 is bi-phase modulated, as is the user data in the following the synchronization pattern. The synchronization identification 204 is provided as three single-bit identification codes $ID_0$, $ID_1$, and $ID_2$, and one single-bit parity code (PAR). The bi-phase modulated identification codes $ID_0$, $ID_1$, and $ID_2$ generally indicate the sync frame number (e.g., in the range of 0 through 6) of the frame, in an embodiment. The synchronization identification 204 of FIG. 3 is shown without any values for the three single-bit identification codes $ID_0$, $ID_1$, and $ID_2$, and one single-bit parity code (PAR), though it is noted that each bit cell begins with a signal transition from the previous bit cell, thereby giving a first channel bit of "1" to indicate the signal transition at the start of the bit cell (i.e., 1x). The second channel bit value depends on the value of the respective identification code $ID_0$, $ID_1$, $ID_2$, or parity code (PAR), and particularly the signal transition, or lack thereof, from the first channel bit to the second channel bit within each corresponding channel bit pair for a bit cell.

Figure 4:
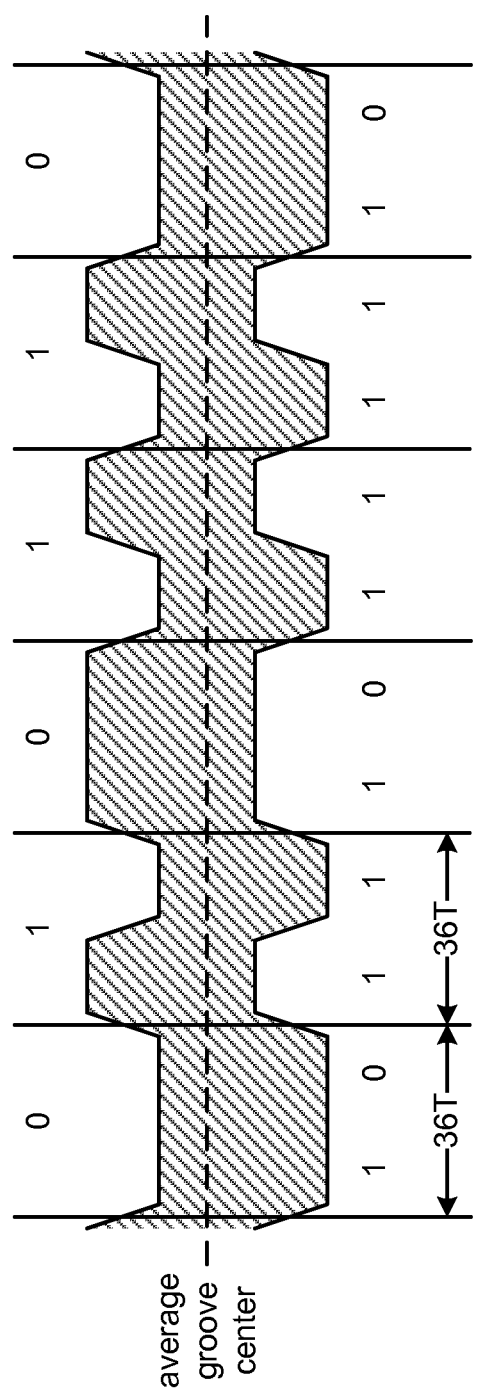
FIG. 4 is an illustration of a bi-phase modulated high frequency modulation wobble groove in a Blu-ray Disc, according to an embodiment.

The concept of bi-phase modulation with respect to the HFM wobble groove of the disc (and corresponding waveform of the readback signal) is shown in FIG. 4. The HFM groove stores the PIC data, including the synchronization patterns discussed above. Again, each bit cell has a length of 36T, and a bit cell corresponds to the spacing used to encode a "1" or a "0" bit as shown above the wobble groove of FIG. 4. Data is provided by having the centerline of the HFM groove deviate from an average groove center according to the bi-phase modulation. In the channel bits (shown below the wobble groove), each "1" or "0" bit corresponds to a transition in the signal, where a "1" bit indicates a signal transition, and a "0" bit indicates no signal transition. For bi-phase modulation, each bit cell of 36T begins with a signal transition as compared to the second channel bit of the previous bit cell. The value associated with the bit cell is then dependent upon the occurrence or non-occurrence of a signal transition in the middle of the bit cell. That is, a transition from a high level to a low level, or from a low level to a high level. In bi-phase modulation, a bit value of "0" is represented by a signal transition at the start of a bit cell, and no signal transition until the start of the next bit cell (i.e., channel bits "10" or no signal transition for 36T). A bit value of "1" is represented by a signal transition at the start of the bit cell and in the middle of the bit cell (i.e., channel bits "11" or a signal transition at 18T). It should be understood that while the terms "high" and "low" are used to distinguish the differences in the waveform of the readback signal, which corresponds to the waveform of the HFM wobble groove, these terms are exemplary only and should not be construed as necessarily referring to a representative value of the readback signal or structure of the HFM wobble groove.

Bi-phase modulation characteristics of sync identification 204 impose certain constraints on the detected channel bit pattern. In particular, as discussed above, with bi-phase modulation, two consecutive signal transitions in the sync identification waveform 204 are separated by either 18T clock cycles or by 36T clock cycles. Accordingly, a transition that occurs outside of the 18T clock cycle or the 36T clock cycle intervals violates constraints imposed by bi-phase modulation. As such, a bi-phase modulation compliant bit pattern includes at most two consecutive bits corresponding to a same value (e.g., both bits high or both bits low), corresponding to the distance of 36T clock cycles between two consecutive transitions in the readback signal. On the other hand, as an example, a clock count of 54T clock cycles between two consecutive transitions, corresponding to three consecutive channel bits (each corresponding to 17T clock cycles) corresponding to a same (e.g., "high" or "low") value, violates the bi-phase modulation constrain. In an embodiment, the HFM detection and timing recovery technique utilizes the bi-phase modulation constraint to detect and correct patterns that violate the bi-phase modulation constraint, thereby improving detection accuracy and minimizing detection errors, in at least some situations.

Generally speaking, the variations or deviations in the groove from the average groove center correspond to the waveform of the readback signal read by the optical data storage system 10. Referring to FIG. 4, in an embodiment, the mean of the area above and below the average groove center (apart from noise) is determined in order to read the highs and lows of the wobble signal. For example, an analog-to-digital converter (ADC) samples the readback signal according to the expected signal or clock timing, T, in one such embodiment. In the wobble groove of FIG. 4, the optical data storage system 10 should read a "low level" for 36T, a "high level" for 18T, a "low level" for 18T, a "high level" for 36T, and so on. However, without knowing the signal timing, T, the ADC is unable to accurately sample the signal and the optical data storage system 10 is unable to decode the signal. Further, the variations in spindle speed, off-center rotation, etc. cause the timing, T, to change, thereby requiring the optical data storage system 10 to quickly and regularly recover the timing, T, with enough frequency to accurately sample and decode the signal, in some embodiments and/or scenarios.

In at least some embodiments, in order to read and decode the HFM signal, the HFM detection and timing recovery techniques utilize the signal transitions in the waveform in the readback signal corresponding to the bi-phase modulated data to recover the timing of the HFM signal and decode the HFM signal. According to an embodiment, by detecting the signal transitions in the bi-phase modulated data, the HFM timing is recovered more quickly as compared to relying solely on the signal transitions in the waveform of the synchronization body 202.

In an embodiment, when recovering the timing from the signal transitions in the synchronization body, some signal transitions do not occur for approximately 54T clocks, in at least some situations. Referring to FIG. 3, there are two such instances in the synchronization body 202. In another respect, the occurrence of the synchronization body 202 is infrequent. The synchronization body 202 occurs at the beginning of each data frame in the PIC cluster. Where a PIC cluster includes two data frames, each with 2048 bytes of data and a 4-byte EDC, which are mapped into a data block of 216 rows by 19 1-byte columns with a single 1-byte synchronization column and single 1-byte column of an address and control data, each synchronization body only occurs every 20 bytes, which corresponds to 168 bi-phase modulated user bits. With each bi-phase modulated user bit corresponding to 36T clocks, the timing is recovered every 6048 clocks. However, in some situations, excessive jitter in the optical drive disc system 10 exists between occurrences of the synchronization body 202 and between occurrences of signal transitions within the synchronization body 202, due to varying rotation speeds and/or off-center rotation. The jitter leads to ADC sampling running too slow or too fast as compared to the actual timing of the HFM groove signal, which results in degraded performance in decoding and reading the HFM data from the disc, in at least some embodiments.

The HFM detection and timing recovery techniques detect the signal transitions in the bi-phase modulated data, where each signal transition occurs at least every 36T in the case of a bi-phase modulated bit "0" and every 18T in the case of a bi-phase modulated bit "1". Referring again to FIG. 4 and to the synchronization identification 204 of FIG. 3, each bi-phase modulated bit (i.e., each bit cell) begins with a transition from the previous bit cell, and the value of the bi-phase modulated bit depends on the occurrence of a signal transition in the middle of the bit cell. Generally, the HFM detection and timing recovery technique look for signal transitions that are approximately 17 and 35 clocks apart (counting from 0 to 17, or 0 to 35), though it should be understood by those of ordinary skill in the art that the HFM detection and timing recover techniques may be modified to accommodate signal transitions having different signal transition intervals. The expected clock count is determined according to the expected signal timing, T, which corresponds to the sampling of the signal.

In particular, the HFM detection and timing recovery technique count the number of clocks between signal transitions in the bi-phase modulated data according to a clock that corresponds to the expected timing, T, of the HFM signal. Because the signal transitions occur at two different times in the bi-phase modulated HFM groove (e.g., every 18T or every 36T), non-overlapping clock count ranges are established for each expected clock count (e.g., 17, 35). The clock count ranges include a corresponding expected clock count based on the expected timing of the HFM signal, and a subset of clock count deviations from the expected clock count. The clock count deviations are clock counts that are less than and more than the expected clock count, and the number of clock count deviations is set according to the expected or probable range of errors in the timing, or as otherwise desired, in various embodiments. For example, the clock count range for an expected clock count corresponding to an 18T transition has clock count deviation of +/−10%, in an embodiment. While the range parameters can be set according to any probability of error in the timing, the clock count deviation is greater for larger expected clock counts, in some situations. In particular, larger expected clock counts provide increased opportunity for jitter and increased timing errors. Accordingly, in an embodiment, a larger range is used for larger expected clock counts (e.g., +/−20% for 36T transitions).

As the HFM timing recovery and decoding techniques count the number or actual clocks between transitions as read from the readback signal, if the actual clock count between signal transitions falls within one of the clock count ranges, then the actual clock count corresponds to the expected clock count between signal transitions corresponding to that clock count range. The actual clock count is then compared with the expected clock count, and the difference is used to generate a phase error signal. The phase error signal represents how far off the timing is to the actual timing of the HFM signal, and is used to adjust the timing used to read the HFM signal. It is noted that the ranges for different expected clock counts between signal transitions (e.g., 18T and 36T) are non-overlapping in order to avoid conflicting timing errors. That is, if the ranges overlap and the actual clock count falls within the overlapping region, it is not known whether the actual clock count corresponded to the expected clock count for a bi-phase modulated bit "0" (e.g., 36T) or the expected clock count for a bi-phase modulated bit "1" (e.g., 18T). In the event the actual clock count does not fall within either range, the HFM detection and timing recovery technique may not make any determination of error in the expected clock timing.

Figure 5:
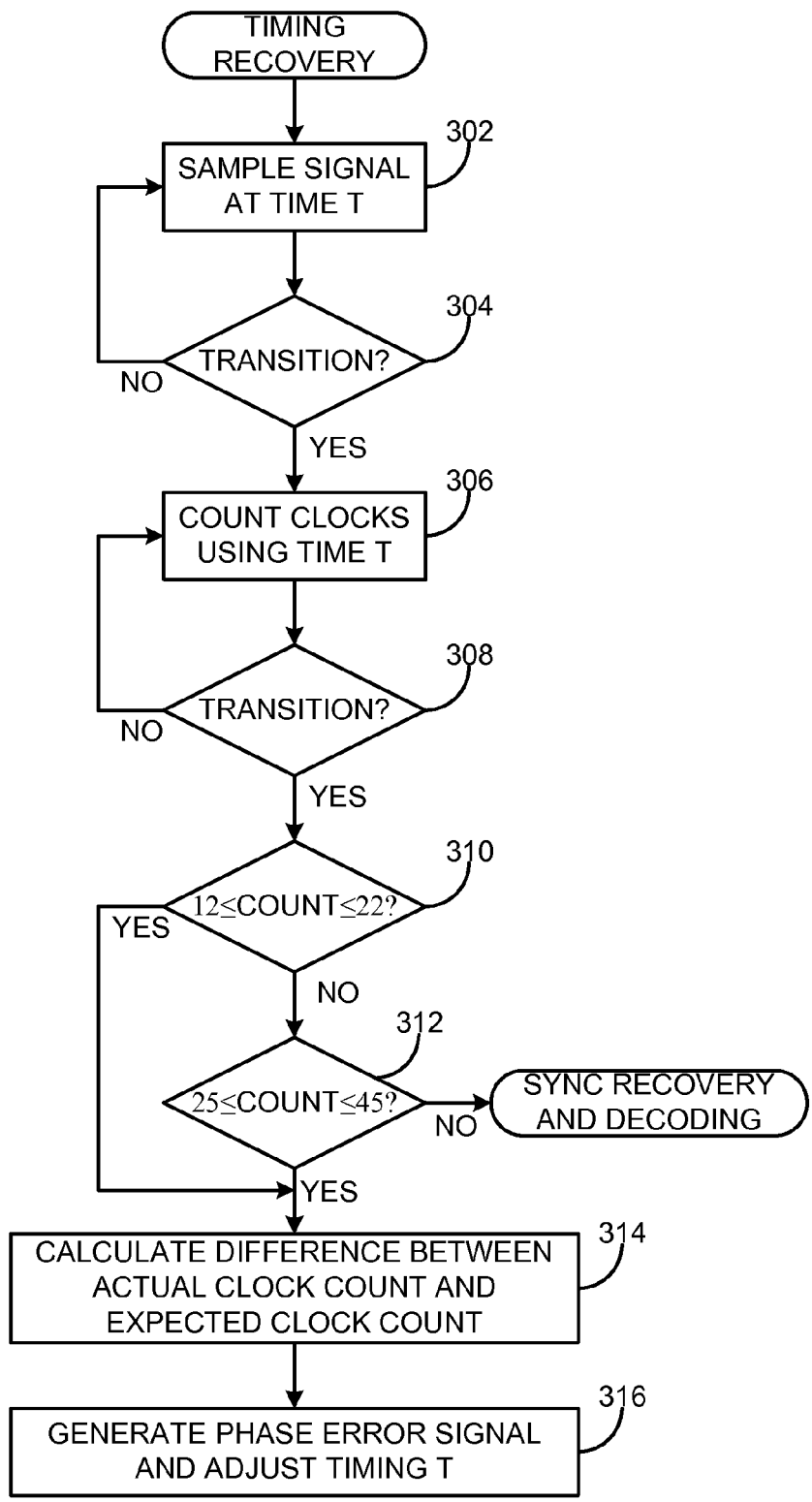
FIG. 5 is a flowchart of an example timing recovery routine which is used to recover the HFM timing, according to an embodiment.

FIG. 5 is an example flowchart of a timing recovery routine according to the above-described HFM detection and timing recovery technique, which is implemented in the optical data storage system 10 in general, and in the signal processing and/or control unit 12 in particular, in an embodiment. In this example, an optical data storage system 10 seeks signal transitions that are approximately 17 and 35 clocks apart (counting from 0 to 17, or 0 to 35), which correspond to 18T and 36T signal transitions, respectively, and which correspond to bi-phase modulated bits of "1" and "0," respectively, in an embodiment. An expected clock count of 17 has a range of 12 to 22 clock counts (i.e., clock count deviation of +/−5), and an expected clock count of 35 has a range of 25 to 45 clock counts (i.e., a clock count deviation of +/−10), in an example embodiment.

Beginning at 302, the readback signal is sampled according to the expected HFM signal timing, T, in order to read the highs and lows in the waveform. For example, referring to FIG. 4, the signal processing and/or control unit 12 samples the readback signal and read a low level for 36T, before the transition to a high level, in an embodiment. At 304 the sampled signals are monitored for these transitions. If no signal transition is detected as determined at 304, whether from high to low or low to high, the routine continues to sample the readback signal.

If a transition is detected as determined at 304, at 306 the signal processing and/or control unit 12 begins to count the number of actual clocks between signal transitions according to the expected signal timing, T, beginning with zero. The expected HFM signal timing is based on the results of the previous timing recovery, in an embodiment.

At 308 the sampled signals are monitored for a subsequent transition. If no signal transition is detected as determined at 308, the signal processing and/or control unit 12 continues to count the number of actual clocks. If a subsequent transition is detected as determined at 308, the signal processing and/or control unit 12 stops the clock count, which is used as the actual clock count between signal transitions, and determines whether the actual clock count corresponds to an 18T transition or a 36T transition by matching the actual clock count with the corresponding ranges.

Specifically, at 310, the signal processing and/or control unit 12 determines whether the actual clock count falls within the range of 12 to 22 clock counts, which corresponds to an expected clock count of 17 (i.e., an 18T transition). If so, the routine proceeds to 314 to determine the error. If not, at 312, the routine determines whether the actual clock count falls within the range of 25 to 45 clock counts, which corresponds to an expected clock count of 35 (i.e., a 36T transition), in which case the routine proceeds to 314 to determine the error. In the event the actual clock count falls within neither range, the routine passes control to a synchronization recovery and decoding routine, as disclosed further below and/or passes a count of zero to 316, in an embodiment.

At 314, the signal processing and/or control unit 12 determines the difference between the actual clock count and the expected clock count according to the corresponding range. For example, if the actual clock count according to the expected clock timing between signal transitions is 19, the signal processing and/or control unit 12 would have determined that the clock count fell within the range of 12 to 22 clock counts at 310, thereby corresponding to an expected clock count of 17. At 314, the signal processing and/or control unit 12 determines that the actual clock count of 19 results in an error of plus-2, indicating that the expected clock timing, T, is too fast. That is, there were too many clock counts (19) according to timing, T, when there were supposed to be only 17 clock counts. If the actual clock count was 16, it will also fall in the range of 12 to 22 clock counts at 310, and result in an error of minus-1 at 314, indicating that the expected clock timing is too slow.

Likewise, if the actual clock count according to the expected clock timing between signal transitions is 40, it will fall in the range of 25 to 45 clock counts at 312, which corresponds to the expected clock count of 35. An actual clock count of 40 results in an error of plus-5 at 314, thereby indicating that the expected clock timing is too fast. If the actual clock count is 32, it will also fall in the range of 25 to 45 clock counts at 312, and result in an error of minus-3 at 314, thereby indicating that the expected clock timing is too slow. Once the difference between actual clock counts and expected clock counts is determined at 314, the signal processing and/or control unit 12 generates a phase error signal at 316, which is sent to a timing loop to generate or adjust the expected signal timing, T, to account for the error, in an embodiment. In the event a zero is passed to 316 as a result of the actual clock count falling within neither range, the zero is interpreted as no error in the timing which generates a phase error of zero, in order to avoid errors in the timing recovery.

In addition to the above-described technique for recovering the timing of the HFM signal, the HFM detection and timing recovery technique is used to detect the synchronization pattern and decode the HFM signal, in at least some embodiments. In particular, the counting of clocks between signal transitions is used to detect the 54T signal transitions that are unique to the synchronization pattern, and, more particularly, the synchronization body 202, as compared to the bi-phase modulated data, in an embodiment. For example, referring to FIG. 3, the channel bit patterns of "100" correspond to signal transitions that do not occur for 54T. As compared to the bi-phase modulated data which has a signal transition at least every 36T, the two instances of channel bit patterns of "100" are unique to the synchronization body 202. By searching for these patterns, the HFM detection and timing recovery technique is able to find the synchronization pattern and decode the readback signal to retrieve the HFM data.

Figure 6A:
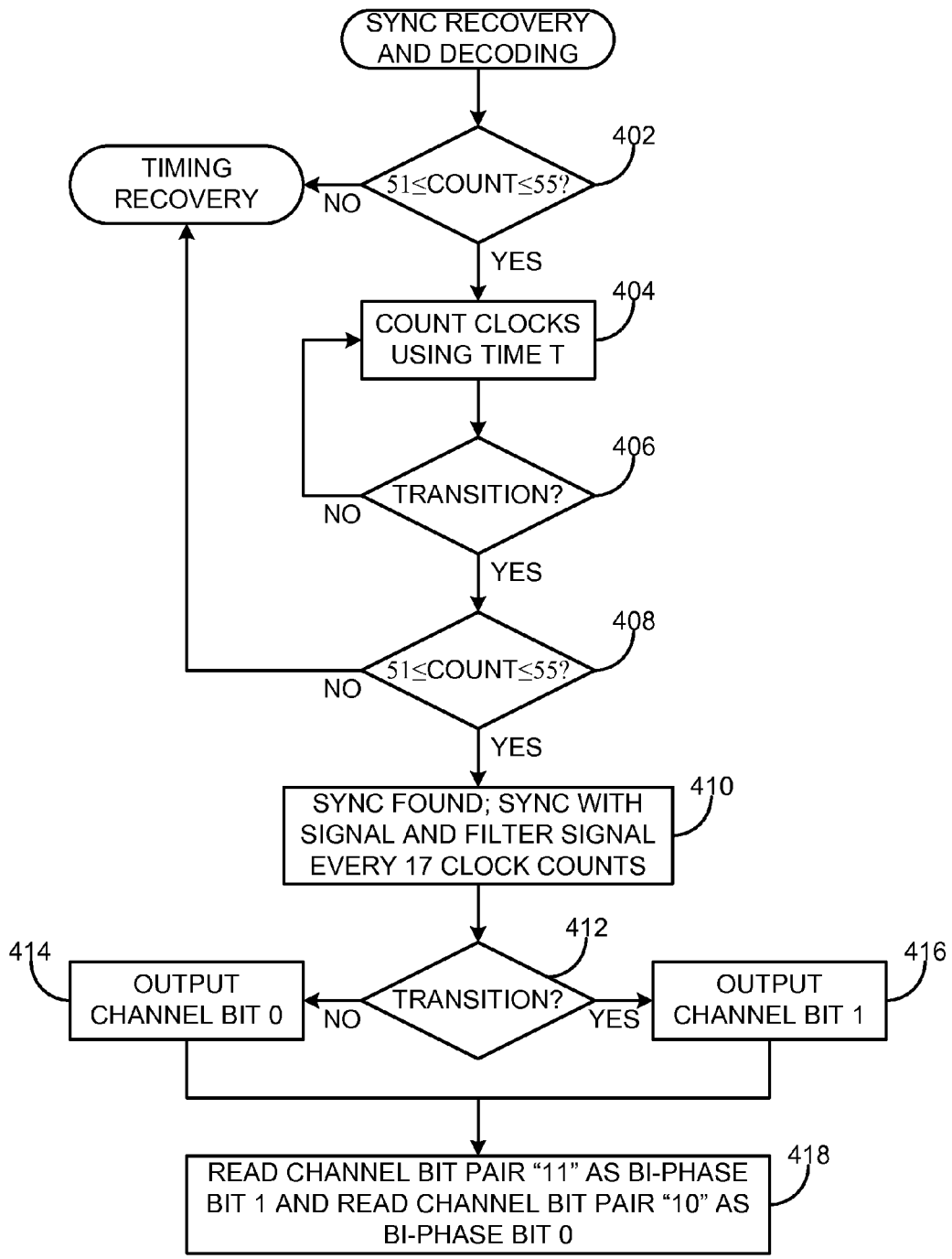
FIGS. 6A-6B are flowcharts of an example synchronization routine which is used to recover a synchronization pattern unique to the HFM signal and synchronize to the HFM signal, according to an embodiment.
Figure 6B:
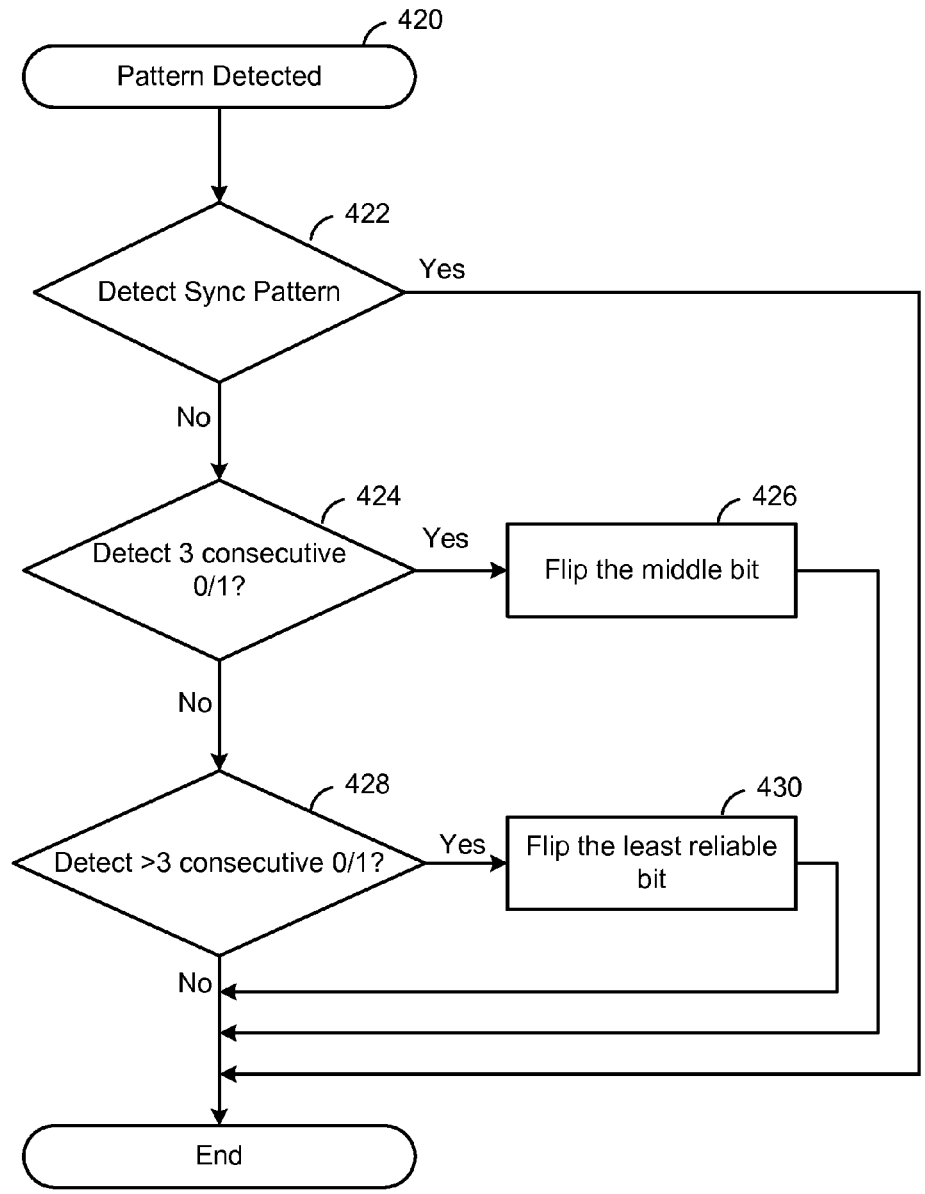

FIGS. 6A-6B are example flowcharts depicting a synchronization recovery and decoding routine according to the above-described HFM detection and timing recovery technique, which is implemented in the optical data storage system 10 in general, and in the signal processing and/or control unit 12 in particular, according to an embodiment. In this example, the signal processing and/or control unit 12 searches for two instances of subsequent signal transitions occurring approximately every 54T. As seen with FIGS. 5 and 6A-6B, in the illustrated embodiment, the synchronization recovery and decoding routine is integrated with the timing recovery routine and utilizes the results of the actual clock count from 306 if the actual count clock between transitions does not correspond with either a signal transition of 18T or 36T. In other embodiments, the synchronization and decoding routine is implemented independent of the timing recovery routine. However, if integrated with the timing recovery routine or otherwise implemented before the timing of the HFM signal is recovered, the expected clock count of 53 (counting from 0 to 53 and corresponding to a 54T transition) has a range, e.g., of 51 to 55 clock counts (i.e., clock count deviation of +/−2) to account for errors in the timing, in an embodiment. In an embodiment, this range is set accordingly to any probability of error, but is non-overlapping with the ranges used for the timing recovery in order to avoid conflicts.

Referring to FIG. 6A, the routine begins at 402, for example, by having control passed from 312 of the timing recovery routine. At 402, the signal processing and/or control unit 12 determines whether the actual clock count falls within the range of 51 to 55 clock counts, which corresponds to an expected clock count of 53 (i.e., an 54T transition). If the actual clock count does not fall within this range, then control is passed back to the beginning of the timing recovery routine. Otherwise, the actual clock count corresponds to a first actual clock count, and the routine proceeds to 404 to count the clocks until the subsequent signal transition as part of a second actual clock count. At 408 the signal processing and/or control unit 12 begins to count the number of actual clocks between signal transitions according to the expected signal timing, T, beginning with zero.

At 406 the sampled signals are monitored for a subsequent transition or otherwise wait for the next clock count from the timing recovery routine. If no signal transition is detected as determined at 406, whether from high to low or low to high, the signal processing and/or control unit 12 continues to count the clocks at 404. If a transition is detected as determined at 406, then, at 408, the signal processing and/or control unit 12 determines whether the second actual clock count falls within the range of 51 to 55 clock counts, which again corresponds to the expected clock count of 53 (i.e., a 54T transition). If the second actual clock count does not fall within this range, then the transitions do not correspond to the consecutive 54T transitions of the synchronization body 202, and control passes back to the beginning of the timing recovery routine. On the other hand, if the second actual clock count falls within the range of 51 to 55 clock counts, then the synchronization signal has been found as determined at 410.

At 410, the routine automatically synchronizes with the HFM signal and signal processing and/or control unit 12 begins filtering the signal in clock count increments corresponding to the size of the channel bits (e.g., 17 clock counts), in an embodiment. Specifically, the signal processing and/or control unit 12 determines whether each 17 clock count sample corresponds to a high level or a low level. As discussed further with respect to FIGS. 7 and 13A-13C, the clock count sample does not need to exactly correspond with the clock counts corresponding to the channel bits.

Consecutive clock count samples are compared at 412 to detect transitions in the waveform of the HFM signal. If no signal transition occurs between clock count samples, either from a high level to a low level or vice versa, as determined at 412, then the channel bit output is "0" at 414. On the other hand, if the signal processing and/or control unit 12 determines a signal transition has occurred between clock count samples, then the channel bit output is "1" at 416.

The channel bit outputs of 414 and 416 are passed to 418, where channel bit pairs are interpreted according to bi-phase modulation, as seen in FIG. 4. In particular, having synchronized with the HFM signal, channel bit pairs having a value of "11" are interpreted as corresponding to a bi-phase modulated bit "1," in an embodiment. Likewise, channel bit pairs having a value of "10" are interpreted as corresponding to a bi-phase modulated bit "0," in an embodiment.

Referring now to FIG. 6B, the channel bit outputs of 414 and 416 are processed at 420, according to an embodiment. In particular, according to an embodiment, at 420, channel bit outputs of 414, 146 are buffered such that sequences of bits can be analyzed to detect bit patterns that violate the bi-phase modulation constraint discussed above. For example, a sequence of channel bits is analyzed to determine whether three or more consecutive channel bits in the sequence have a same value (i.e., no transition between the channel bits), in an embodiment. Because three consecutive channel bits having the same value violates the bi-phase modulation constraint, such patterns are not valid for the sync identification and the user data portions of the HFM signal, but are be valid for the sync body portion of the HFM signal because the sync body portion is not bi-phase modulated. At 422, it is determined whether the detected pattern corresponds to a sync body signal pattern. In an embodiment, when it is determined at 422 that the detected bit pattern corresponds to the sync body 202, the routine terminates.

On the other hand, when it is determined at 420 that the detected pattern does not correspond to the sync body portion of the readback signal, then the scheme continues at 424, at which it is determined whether the detected pattern includes a sequence of three consecutive bits corresponding to a same value (e.g., three consecutive ones or three consecutive zeroes). When a sequence of three consecutive bits corresponding to a same value are detected at 424, then the middle bit in the sequence is flipped at 426, in an embodiment. For example, if three consecutive bits having a value of logic zero (0) are detected at 424, then the middle bit of the three consecutive bits is changed to a value of logic one (1) at 426. Similarly, as another example, if three consecutive bits having a value of logic zero (0) are found at 424, the middle bit of the three consecutive bits is changed to a value of logic one (1) at 426.

When a sequence of three consecutive channel bits corresponding to a same value is not detected at 424, then the it is determined at 428 whether the channel bit pattern includes a sequence of greater than consecutive channel bits (e.g., four, five, etc. channel bits) corresponding to a same value. When it is determined at 428 that the pattern includes a sequence of more than three consecutive channel bits corresponding to a same value, then the least reliable bit in the sequence of bits is flipped at 430. For example, when the sequence of consecutive bits found at 428 corresponds to a sequence of bits having a value of logic zero (0), then the least reliable bit is changed to a value of logic one (1) at 430. Similarly, when the sequence on consecutive bits found at 428 corresponds to a sequence of bits having a value of logic zero (0), then the least reliable bit is changed to a value of logic one (1) at 430. In an embodiment, determining which bit in the sequence of bits found to have a same value at 428 is the least reliable bit comprises determining which bit in the sequence of bits corresponds to a value that is closest to the threshold of the detector that was used to determine the value of the bit, as will be explained in more detail below.

When it is determined at 428 that the pattern does not include a sequence of greater than three bits corresponding to a same value, the routine exits, and no correction of the detected pattern is performed.

Figure 7:
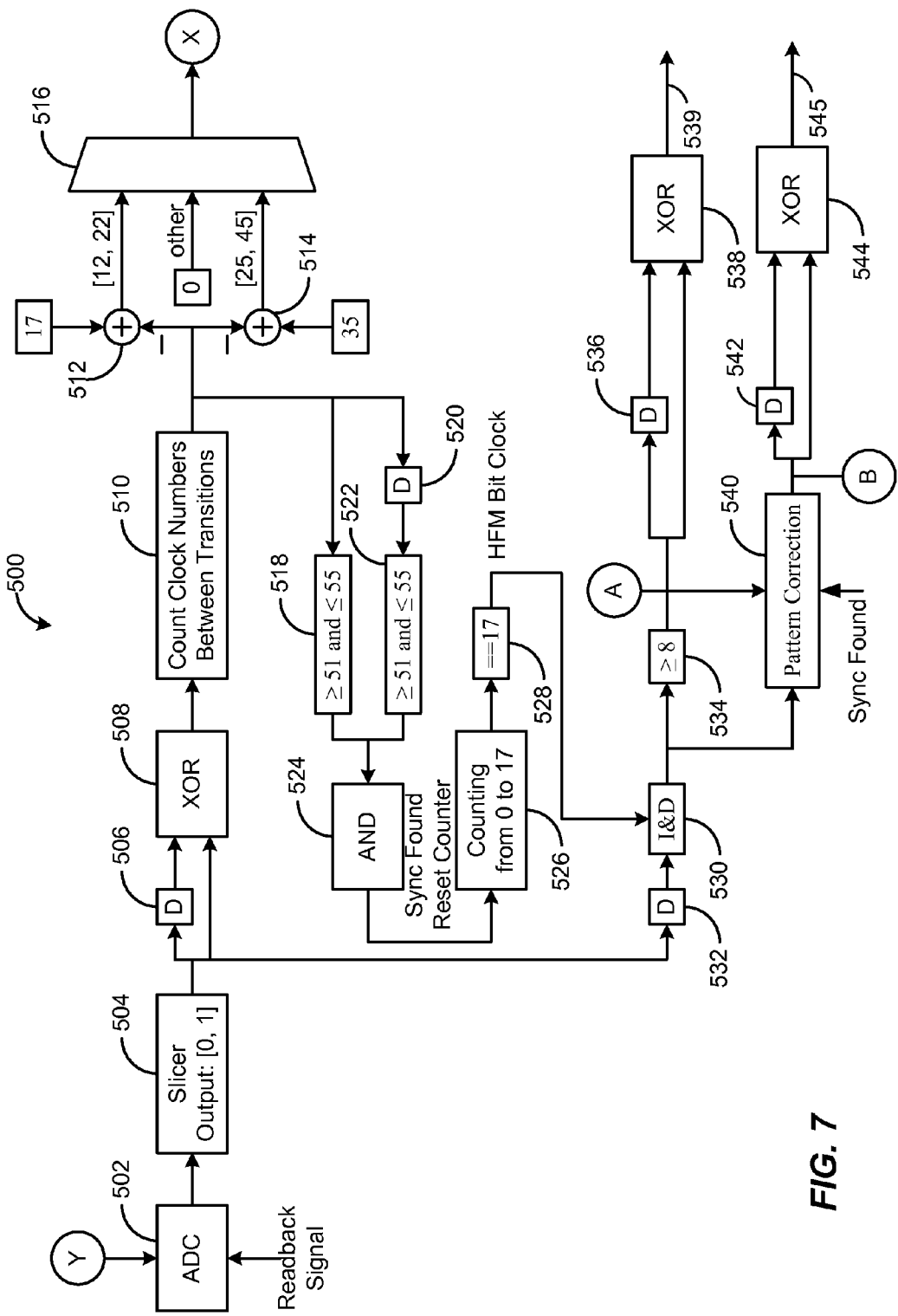
FIG. 7 is a block diagram of an example timing recovery and decoder system that implements timing recovering of the high frequency modulation signal to identify a timing error in recovering the HFM signal of a Blu-ray Disc, according to an embodiment.

FIG. 7 is a block diagram of an example timing recovery and decoder system 500 that implements the HFM detection and timing recovery technique disclosed above. The timing recovery and decoder system 500 is implemented in the optical data storage system 10, and, more particularly, is implemented as a separate circuit, as part of the signal processing and/or control unit 12 or any other circuit of the optical data storage system 10, in various example embodiments.

Referring to FIG. 7, the timing recovery and decoder system 500 includes an analog-to-digital converter (ADC) 502 with an output coupled to a slicer 504. The ADC 502 converts the phase modulations from the pickup head into digital data by sampling the readback signal from the detector 15 according to timing intervals. The timing intervals correspond to the expected timing T of the HFM signal received by the optical data storage system 10, where the expected timing T is adjusted by the timing recovery and decoder system 500 to compensate for errors as compared to the actual timing of the HFM signal. Ideally, each sample corresponds to a channel bit in the waveform, though timing errors prevent this from being the case in some situations.

Although sampled at intervals of T, the phase modulations from the pickup head are generally sinusoidal, and the output of the ADC 502 is likewise sinusoidal. The slicer 504 (which is also known as a clipper circuit, amplitude selector or limiter) converts the sinusoidal output from the ADC into outputs of "0" or a "1" for each sample, where the "0" corresponds to a low level in the waveform of the readback signal, and the "1" corresponds to a high level, in an embodiment. For example, the slicer 504 outputs a "0" when the output of the ADC is below 0, and output a "1" when the output of the ADC is above zero, in an embodiment.

The output of the slicer 504 is provided to a signal transition detection assembly, which monitors and detects signal transitions in the readback signal. In this example, the signal transition detection assembly includes a delay element 506 and an exclusive disjunction element, such as an exclusive-or circuit (XOR) element 508. The output from the slicer 504 is split with one branch provided as an input into the delay element 506 and the other branch provided as an input to the XOR element 508. The output of the delay element 506 is provided as another input to the XOR element 508. In this example, the delay factor of the delay element 506 is set to T. With the signal transition detection of FIG. 7, the delay element 506 delays the one input to the XOR element 508, allowing the values of consecutive samples to be compared. For example, if consecutive samples each have a value of "1" or "0" (i.e., XOR inputs of "11" or "00"), then no transition has occurred between the samples and the output of the XOR element 508 is "0." On the other hand, if the value of consecutive samples is "1" then "0" or "0" then "1" (i.e., XOR inputs of "10" or "01") then a transition has occurred between the samples and the output of the XOR element 508 is "1."

The output of the signal transition detection assembly is provided to a counter 510. The counter 510 begins counting the number of actual clocks (e.g., clock cycles) between signal transitions according to the expected timing, T, upon receiving an output from the signal transition assembly indicating that a signal transition has occurred. For example, an output of "1" from the XOR element 508 triggers the counter 510 to reset and begin counting. When a subsequent signal transition occurs, the XOR element 508 triggers the counter 510 again, at which point the counter 510 outputs the clock count, resets and begins counting again. The clock count output by the counter 510 corresponds to the actual clock count between signal transitions, according to the expected timing, T. In this example, the counter 510 begins counting at zero, so a clock count of 18 is output as 17 (counting from 0 to 17).

The output from the counter 510 is provided as an input to a range determination assembly, which determines whether the actual clock count falls within a range corresponding to an 18T transition, within a range corresponding to a 36T transition, or neither. In this example, the range determination assembly includes two adders 512, 514 and a multiplexer (MUX) 516. The adder 512 includes an additional input of "17," which is the expected clock count if the signal transition corresponds to an 18T transition. The adder 514 includes an additional input of "35," which is the expected clock count if the signal transition corresponds to a 36T transition. The difference between the respective inputs of "17" and "35" of the adders 512, 514 and the input of the actual clock count from the counter 510 is provided to the MUX 516. If the actual clock count from the counter 510 falls within the predetermined range of [12, 22] (i.e., the difference from the adder is within +/−5 as compared to the expected clock count of "17"), then the signal transition corresponds to an 18T transition with an error corresponding to the difference. Likewise, if the actual clock count from the counter 510 falls within the predetermined range of [25, 45] (i.e., the difference from the adder is within +/−10 as compared to the expected clock count of "35"), then the signal transition corresponds to a 36T transition with an error corresponding to the difference. The output from each adder 512, 514 is provided as an input to the MUX 516, where each input corresponds to the difference between the actual clock count and the expected clock count as determined by the corresponding adder 512, 514.

The MUX 516 determines if the difference between the actual clock count and the expected clock count of 17 is within the range corresponding to the 18T transition (e.g., within +/−5), if the difference between the actual clock count and the expected clock count of 35 is within the range corresponding to the 36T transition (e.g., within +/−10), or neither. For example, if the output from the adder 512 is within +/−5 clock counts (e.g., an actual clock count of 22, which is +5 clock counts), then the actual clock count falls within the range of [12, 22] and corresponds to the 18T transition. In this example, the output from the adder 514 is not within +/−10 clock counts, so the actual clock count does not fall within the range of [25, 45] and does not corresponds to the 36T transition. As such, the MUX 516 selects the difference between the actual clock count and the expected clock count from the adder 512, and does not select the input from the adder 514.

On the other hand, if the output from the adder 514 is between +/−10 clock counts (e.g., an actual clock count of 25, which is −10 clock counts), then the actual clock count falls within the range of [25, 45] and corresponds to the 36T transition. The output from the adder 512 is not within +/−5 clock counts, so the actual clock count does not fall within the range of [12, 22] and does not corresponds to the 18T transition. In this case, the MUX 516 selects the difference between the actual clock count and the expected clock count from the adder 514, instead of the input from the adder 512. In the event the actual clock count does not correspond to either the 18T transition or the 36T transition, (e.g., the input from adder 512 is not within +/−5 and the input from the adder 514 is not within +/−10), the MUX 516 selects an input of "0", which effectively results in no change in the timing given that identification of the signal transition remains unresolved, in an embodiment.

Based on the selected difference, the MUX 516 provides an output phase error signal corresponding to the expected clock count. The MUX 516 is hard-coded or otherwise designed to select the appropriate input, in an embodiment. For example, the MUX 516 is designed as an integrated circuit (e.g., application-specific integrated circuit (ASIC)), that includes a set of comparators for each input that compares the input to the upper and lower parameters of the range, in an embodiment.

For example, in an embodiment, a comparator compares the input from the adder 512 to −5 (or other desired lower range parameter) and another comparator compares the input to +5 (or other higher range parameter). The comparators output a "1" if the logical comparison is "true" and output a "0" if the comparison if false, for example, in this embodiment. If both are true, then the actual clock count is deemed to correspond to the 18T transition, and the MUX 516 selects the input from the adder 512. On the other hand, another set of comparators compares the input from the adder 514 to −10 and to +10, and if the comparator outputs are both "true" then the actual clock count is deemed to correspond to the 36T transition, and the MUX 516 selects the input from the adder 514. If the output is "false" for the comparator sets of both inputs from adders 512, 514, then the MUX 516 selects the "0" input, in an embodiment. Although the above example relates to a particular implementation and design of the MUX 516, it should be understood by those of ordinary skill in the art that the MUX 516 may be otherwise implemented as desired, either alone or in conjunction with other elements, to perform the above-described selection. For example, the comparators and other logical elements are implemented external to the MUX 516 to generate an external selection signal, and the MUX 516 may be implemented as a generic MUX that selects an input based on the external selection signal, in some embodiments. Regardless of the implementation, in this example the MUX 516 outputs the results of the adder 512 if the count is between [12, 22], outputs the results of the adder 514 if the count is between [25, 45] and outputs 0 for all other conditions.

If the difference is positive (i.e., more actual clock counts than expected clock counts), then the expected timing, T, is too fast, and if the difference is negative, then the expected timing, T, is too slow. A difference of zero indicates that the expected timing, T, is matched with the HFM timing. In any case, the phase error signal is fed into a timing loop to adjust the expected timing, T. An input of zero is provided to the MUX 516 in the event the actual clock count does not fall within either range, thereby forcing a phase difference of zero from the MUX 516 to avoid erroneous adjustment of the expected timing, T.

Figure 8:
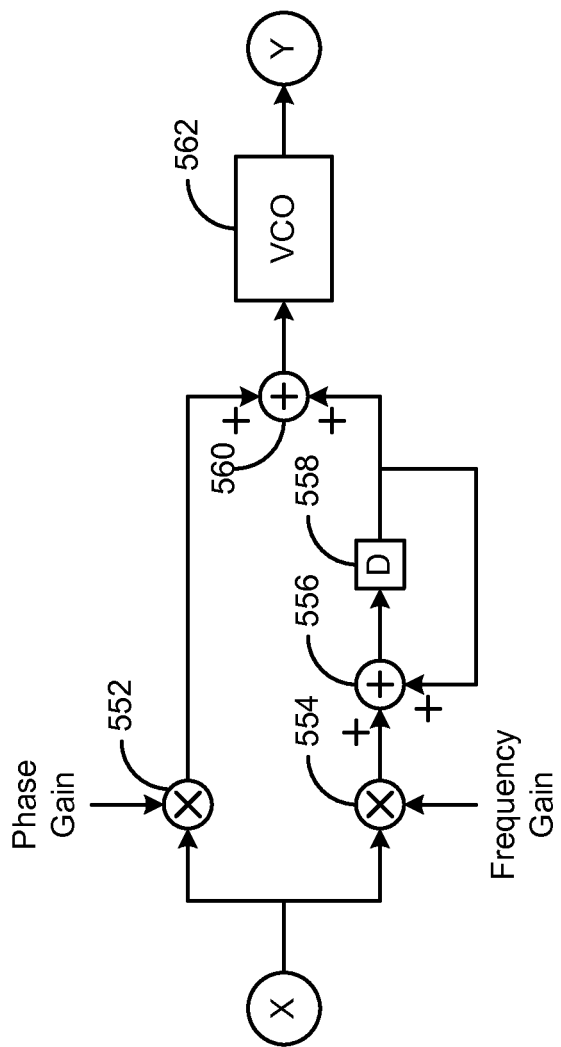
FIG. 8 is a block diagram of an example timing loop used to drive the analog-to-digital converter of the timing recover and decoder system of FIG. 7, according to an embodiment.

FIG. 8 is an example of a timing loop or phase locked loop (PLL), which is used to adjusting the timing T for the error from the timing recovery and decoding system 500 of FIG. 7, according to an embodiment. The output of the timing loop/PLL is fed back to the timing recovery and decoding system 500, or any other element of the optical data storage system 10 that utilizes HFM timing to read data from the disc, in various embodiments. For example, the timing recovery and decoding system 500 utilizes the adjusted timing T as the sampling rate for the ADC 502, for the delay element 506 and for the counter 510, among others, in an embodiment. Timing loops and PLLs are generally well-understood by those of ordinary skill in the art. Accordingly, it should be understood by those of ordinary skill in the art that the timing loop/PLL of FIG. 8 is exemplary only, and other methods and apparatus for adjusting the timing T based on the error signal from the timing recovery and decoding system are utilized in other embodiments.

Referring to FIG. 8, the timing/phase locked loop includes a phase gain multiplier 552, a frequency gain multiplier 554, an integrator/accumulator having an adder 556 and a delay element 558, and a voltage control oscillator (VCO) 612. The phase gain and frequency gain is programmable, and is chosen based on the type of frequency disturbance for which the timing is being compensated, in an embodiment.

The phase error signal from the timing recovery and decoder system 500 is split to a phase branch having the phase multiplier 552 and to a frequency branch having the frequency gain multiplier 554 and the integrator/accumulator. The output of each branch is provided to the adder 560, which outputs a bias voltage to the VCO 562. The effect is to have the output voltage (or frequency) equal to the input voltage (or frequency). Using the bias voltage, the VCO 562 is set to a nominal setting to run or oscillate according to timing T, which now corresponds to the HFM timing and generates clock information according to T. The output of the VCO 562 is then used to drive the ADC 502 or any other element that relies upon the timing T. It is noted, however, that a numeric control oscillator is used in place of the VCO 562, in some embodiments.

The description of the timing recovery and decoder system 500 thus far provides an example for recovering the timing of the HFM signal as received by the optical data storage system 10. However, the above described system is also be used, in part, to recover the synchronization pattern from the readback signal and decode the HFM signal, in an embodiment. Referring again to FIG. 7, the timing recovery and decoder system 500 includes a synchronization assembly. The synchronization assembly is used to search for the unique waveform corresponding to the sync pattern. In this example, the synchronization assembly includes a first range element 518, a delay element 520, a second range element 522 and a logical conjunction (AND) element 524.

Generally, the synchronization assembly receives the clock counts from the counter 510, which are input to the first range element 518 and the delay element 520. In this example, the delay factor of the delay element 520 is set to delay the input until a subsequent clock count is received from the counter 510. For example, the clock count in the delay element 520 is "pushed out" upon receipt of the next clock count from the counter 510, in an embodiment. The delayed clock count is then provided as an input to the second range element 522. As a result, two consecutive clock counts are simultaneously provided to each of the range elements 518, 520, in this embodiment.

In one example, the range elements 518, 520 may be each be provided as comparators and an AND element, where a first comparator compares the inputted actual clock count to 51 (or other desired lower range parameter) and a second comparator compares the inputted actual clock count to 55 (or other higher range parameter). In an embodiment, the comparators outputs a "1" if the logical comparison is "true" and outputs a "0" if the comparison if false. For example, the first comparator outputs a "1" if the actual clock count is greater than or equal to 51, and the second comparator outputs a "1" if the actual clock count is less than or equal to 55. In this case, the comparator outputs are provided as inputs to the AND element, which outputs a "1" indicating that the actual clock count for the corresponding range element is between 51 and 55 clock counts. If the first and/or second comparator outputs a "0", then the actual clock count does not fall within the range, and the AND element outputs a "0" to the AND element 524. In the alternative, the AND element 524 is provided as a four-input AND element that receives the outputs directly from the first and second comparators of each range element 518, 522, in another embodiment. Although the above example is one manner of implementing the range elements 518, 522, those of ordinary skill in the art will recognize that various implementations of the range elements 518, 522 are utilized in other embodiments.

Each of the first and second range elements 518, 522 determines whether the respective actual clock count from the counter 510 falls within the predetermined range of [51, 55] (i.e., the difference is within +/−2 as compared to the expected clock count of "53"). As with the range parameters for the clock count ranges of the timing recovery described above, the range parameters or clock count deviations for the synchronization assembly is set according to the expected or probable range of errors in the timing, or as otherwise desired, in an embodiment. If so, then the output of the range element 518, 522 is provided as a "1" or other indication that the actual clock count corresponds to a 54T transition. If the difference is greater than +/−2, then the output of the range element 518, 522 is provided as a "0" or other indication that the actual clock count does not correspond to a 54T signal transition. If consecutive actual clock counts each correspond to a 54T transition as determined by the respective range elements 518, 522, then the outputs of the range elements 518, 522 (e.g., "1" and "1") trigger an indication that the synchronization pattern has been found. In the example shown in FIG. 7, the outputs are provided to the AND element 524, which outputs a "1" as the indication that the synchronization pattern has been found. As such, the timing recovery and decoder system is able to recover the synchronization pattern by identifying the successive 54T clock counts unique to the synchronization body 202 by having both range elements 518, 522 perform the comparisons concurrently for successive actual clock counts from the counter 510.

In addition to recovering the synchronization pattern, the timing recovery and decoder system is further used to decode the readback signal as read from the disc, in an embodiment. As shown in FIG. 7, the output from the AND element 524 is provided to another counter 526. When a "1," or other indication that the synchronization pattern has been found, is provided to the counter 526, the counter 526 is reset and begins counting from 0 to 17, which corresponds to the channel bits of 18T, which is the HFM bit clock (i.e., a channel bit every 18T). In an embodiment, the counter 526 counts according to the expected clock count, T. Once a count of 17 has been reached, the HFM bit clock is set at an HFM bit clock element 528 and provided to a decoding assembly, which includes an integrate and dump filter 530, a delay element 532, a comparator 534 and a signal transition detection assembly. The HFM clock element 528 is provided as a comparator that determines if the clock count equals "17" and provides a corresponding output to the integrate and dump filter 530. As will be understood by those of ordinary skill in the art, the channel bit size of 18T corresponds with the Blu-ray standard, but is exemplary only, and the count corresponds to whatever the channel bit size may be, in an embodiment. It should also be understood that while an integrate and dump filter 530 is disclosed, other filter assemblies are used that are set to filter the incoming signal in increments corresponding to the channel bit size, in other embodiments.

The integrate and dump filter 530 receives the output from the slicer 504, which is delayed by the delay element 532. The delay element 532 delays the slicer output to match the HFM clock (e.g., a period of 17 channel bits, counting from 0 to 17) to the channel samples. As discussed above, the readback signal is represented by a "0" or "1" for each sample taken according to the expected timing, T, and 18 samples (counted from 0 to 17) generally correspond to a channel bit, as shown in FIGS. 3 and 4. The delay element 532 delays the samples to match the HFM clock as inputted to the integrate and dump filter 530.

Generally, the integrate and dump filter 530 sums the samples and resets the sum to zero every N input samples, where N is the integration period parameter as set by the HFM bit clock. That is, the integrate and dump filter 530 integrates the samples delayed by the delay element 532, and resets to zero every 17 clocks, as set from the HFM bit clock element 528. The reset occurs after the block produces its output at that time step. After 17 clocks, the integrate and dump filter 530 outputs the sum of the inputted samples accumulated during that time. For example, if the output from the slicer 504 for 17 clocks (i.e., 18T) is provided as "000000111111111111" which corresponds to a readback signal having a low level for 6 clocks and a high level for 12 clocks, the integrate and dump filter 530 outputs a value of "12". In another example, if the slicer output is provided as "000000000000001111" for 17 clocks, which corresponds to a readback signal having low level for 14 clocks and a high level for 4 clocks, the integrate and dump filter 530 outputs a value of "4".

Based on the output from the integrate and dump filter 530, the comparator 534, or other comparable element, determines whether the sum from the integrate and dump filter 530 is greater than or equal to a certain detection threshold. In an embodiment, the value of the threshold is chosen as the midpoint in the 17 clock count (i.e., "8"), where any value less than "8" corresponds to a channel bit of "0" and any value equal to or less that "8" corresponds to a channel bit of "1". In another embodiment, the value of the threshold is chosen to be another suitable value (e.g., 6, 7, 9, 10, etc.). Ideally, the expected timing, T, corresponds to the actual timing of the HFM signal, and the timing recovery and decoder system synchronizes with the signal. However, this is not always the case, as the synchronization and/or timing may be off due to errors in the expected timing, T, for example. Although the expected timing, T, may be adjusted for errors based on the timing recovery technique described above and various aspects of the timing recovery and decoder system may use this adjusted timing, the decoding of the signal may still account for the errors in synchronization and/or timing.

In order to address the potential for errors, the timing recovery and decoder system simply determines whether the readback signal received at the integrate and dump filter 530 mostly corresponds to a "1" (e.g., mostly a high level for 17 clocks) or mostly corresponds to a "0" (e.g., mostly a low level for 17 clocks). The comparator 534 makes this determination by comparing the filter output to the "8". For example, if the slicer output is provided as "000000111111111111" (i.e., a sum of "12" from the filter 530), then that 17 clock portion of the readback signal mostly corresponds to high level, and a "1" is output from the comparator 534. On the other hand, if the slicer output is provided as "000000000000001111" for 17 clocks, that portion of the readback signal mostly corresponds to a low level, and a "0" is output from the comparator 534. Using this technique, or similar techniques, the timing recovery and decoder system is able to identify the waveform (i.e., the highs and lows) of the readback signal.

The output of the comparator 534 is provided to another signal transition detection assembly, which monitors and detects signal transitions in the readback signal. In this example, similar to the signal transition detection assembly above, the signal transition detection assembly includes a delay element 536 and an exclusive disjunction element, such as an exclusive-or circuit (XOR) element 538. The output from the comparator 534 is split with one branch provided as an input into the delay element 536 and the other branch provided as an input to the XOR element 538. The output of the delay element 536 is provided as another input to the XOR element 538. In this example, the delay factor of the delay element 536 is set to the HFM bit clock corresponding to the size of the channel bits (e.g., 17 clock counts). The delay element 536 delays the one input to the XOR element 538, allowing the values for consecutive 18T increments from the comparator 534 to be compared. As a result, the delay element 536 and XOR element 538 are able to detect transitions from high to low or low to high in the readback signal, where the signal transitions, and hence the XOR output, correspond to the channel bit values. For example, if consecutive increments each have a value of "1" or "0" (i.e., XOR inputs of "11" or "00"), then no transition has occurred between the samples and the output of the XOR element 538 (and corresponding channel bit value) is "0". On the other hand, if the value of consecutive increments is "1" then "0" or "0" then "1" (i.e., XOR inputs of "10" or "01") then a transition has occurred between the samples and the output of the XOR element 538 (and corresponding channel bit value) is "1."

From the channel bit output of the XOR element 538, the bi-phase modulation is recovered, in an embodiment. Because a bi-phase modulated bit is provided as a channel bit pair, and each bi-phase modulated bit begins with a signal transition, the channel bits for each bi-phase modulated bit are provided in the form of "1X". As such, consecutive channel bits "10" are detected as a bi-phase modulated bit of "0" and consecutive channel bits "11" are detected as a bi-phase modulated bit of "1". In an embodiment, the output of the XOR element 538 corresponds to a first output 539 of the detection system.

The output of the comparator 534 is also provided to a pattern correction module 540. The pattern correction module 540 buffers sequences of bits consecutively received from the comparator 534 and analyzes the bits to detect certain patterns in the sequences of bits, in an embodiment. For example, the pattern correction module 540 performs the routine of FIG. 6B or another suitable routine to detect and correct patterns that violate the bi-phase modulation constraint discussed above. When a pattern that violates the bi-phase modulation constraint is detected in a sequence of bits, the pattern correction module 540 corrects the sequence to fit the bi-phase modulation constraint, in an embodiment. For example, the pattern correction module 540 flips the middle bit or flips the least reliable bit in the detected sequence of bits as describe above with respect to FIG. 6B, in an embodiment. Specifically, when a sequence of three consecutive bits corresponding to a same value (e.g., three consecutive zeroes or three consecutive ones) is detected, the pattern correction module 540 flips the middle bit in the detected sequence of bits, in an embodiment. For example, when a sequence "000" is detected, the pattern correction module 540 changes the sequence of bits to "010," in this embodiment. Similarly, when a sequence "111" is detected, the pattern correction module 540 changes the sequence of bits to "101," in this embodiment. In an embodiment, the module 540 additionally receives the "sync found" signal from the output of the AND element 524 that indicates to the module 540 whether a sync pattern has been detected in the sequence being analyzed by the module 540. In this embodiment, when the sync found signal indicates that a sync pattern has been detected, the module 540 does not flip the middle bit in the sequence of three consecutive bits having a same value, thereby protecting the sync pattern in the sequence.

When a sequence of more than three consecutive bits corresponding to a same value (e.g., four consecutive zeroes or four consecutive ones) is detected, the pattern correction module 540 determines which of the bits in the detected sequence corresponds to a least reliable bit, and then flips the bit that corresponds to the least reliable bit, in an embodiment. To determine which bit in the sequence of bits corresponds to the least reliable bit, the pattern correction module 540 analyzes the output of the integrate and dump filter 530 corresponding to the sequence of bits, in an embodiment. For example, the pattern correction module 540 compares the output of the integrate and dump filter 530 corresponding to each of the bits in the detected sequence of bits to the threshold used by the comparator 534 (e.g., 8) and selects the bit for which the output of the integrate and dump filter 530 is closest to the threshold as the least reliable bit, in an embodiment. The pattern correction module 540 then flips the least reliable bit. For example, when a sequence "1111" is detected, and the second bit in the sequence is determined to be the least reliable bit, then the pattern correction module 540 flips the second bit thereby changing the detected sequence to the sequence "1011," in an example scenario.

Upon analyzing recovered bits and correcting patterns that violate the bi-phase modulation constraint in the recovered bits, the analyzed and, if necessary, corrected sequence of channel bits is provided to another signal transition detection assembly, which monitors and detects signal transitions in the readback signal. In this example, similar to the signal transition detection assembly above, the signal transition detection assembly includes a delay element 542 and an exclusive disjunction element, such as an exclusive-or circuit (XOR) element 544. The output from the module 540 is split with one branch provided as an input into the delay element 542 and the other branch provided as an input to the XOR element 544. The output of the delay element 542 is provided as another input to the XOR element 544. In this example, the delay factor of the delay element 542 is set to the HFM bit clock corresponding to the size of the channel bits (e.g., 17 clock counts). The delay element 542 delays the one input to the XOR element 544, allowing the values for consecutive 18T increments from the comparator 544 to be compared. As a result, the delay element 542 and XOR element 544 are able to detect transitions from high to low or low to high in the readback signal, where the signal transitions, and hence the XOR output, correspond to the channel bit values. For example, if consecutive increments each have a value of "1" or "0" (i.e., XOR inputs of "11" or "00"), then no transition has occurred between the samples and the output of the XOR element 544 (and corresponding channel bit value) is "0". On the other hand, if the value of consecutive increments is "1" then "0" or "0" then "1" (i.e., XOR inputs of "10" or "01") then a transition has occurred between the samples and the output of the XOR element 544 (and corresponding channel bit value) is "1."

From the channel bit output of the XOR element 544, the bi-phase modulation is recovered, in an embodiment. Because a bi-phase modulated bit is provided as a channel bit pair, and each bi-phase modulated bit begins with a signal transition, the channel bits for each bi-phase modulated bit are provided in the form of "1X". As such, consecutive channel bits "10" are detected as a bi-phase modulated bit of "0" and consecutive channel bits "11" are detected as a bi-phase modulated bit of "1". In an embodiment, the output of the XOR element 538 corresponds to a first detection output 539 of the system 500, and the output of the XOR element 544 corresponds to a second detection output 545 of the system 500. In an embodiment, the system 500 includes a selection unit, such as a multiplexer, configured to select the first detector output 539 or the second detector output 545 as the detection output of the system 500. In an embodiment, the selection is based on signal conditions, for example. In an embodiment, when output 539 is selected as the output of the system 500, the pattern correction module 540, the delay element 542 and the XOR element 544 are disabled, for example to save power consumed by the system 500. Similarly, when output 545 is selected as the output of the system 500, the delay element 536 and the XOR element 538 are disabled, in an embodiment. However, in other embodiments, both the output 539 and the output 545 are generated even though only one of the outputs 539, 540 is selected as the output of the system 500. In other embodiments, the components corresponding to the non-selected data path are not disabled and both outputs 539 and 545 are generated, even though only one of the outputs 539, 545 is selected as the detection output of the system 500.

Figure 9A:
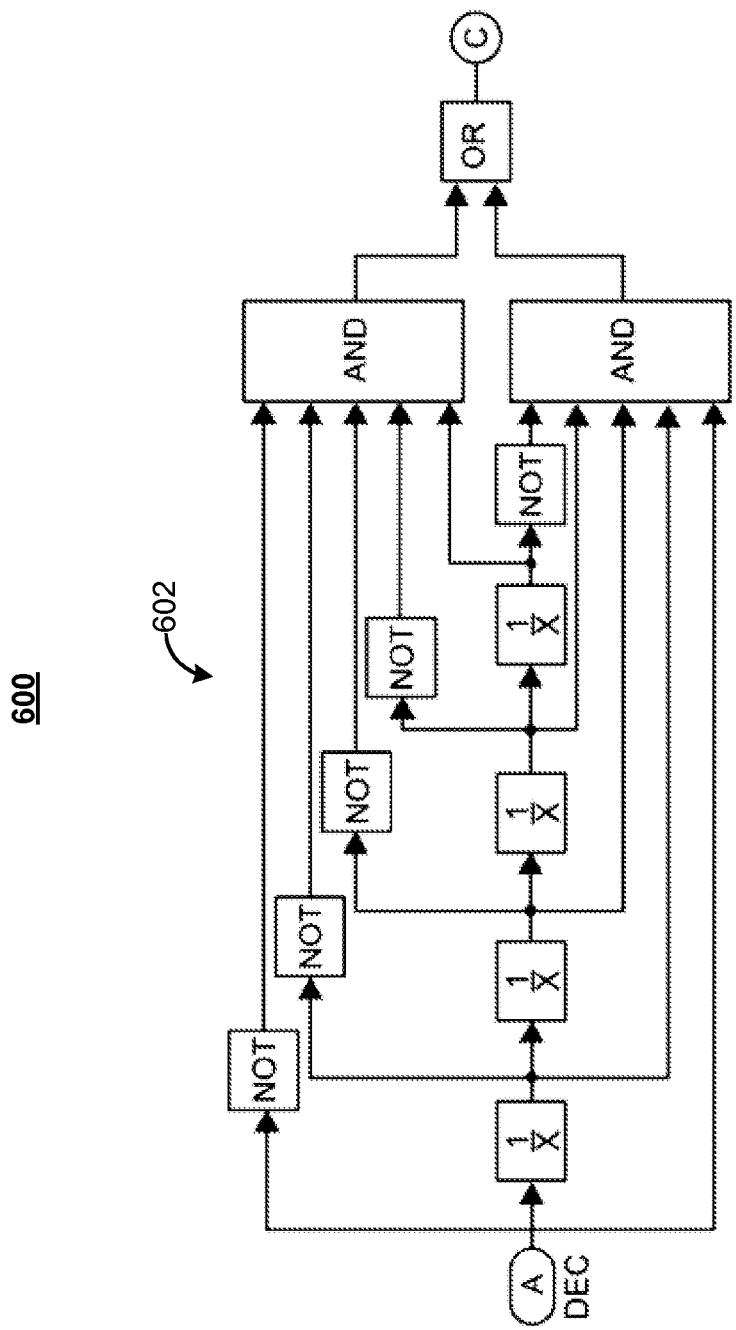
FIGS. 9A-9C illustrate respective portions of an example circuit that implements bit flipping functionality of a pattern correction module, according to an embodiment.
Figure 9B:
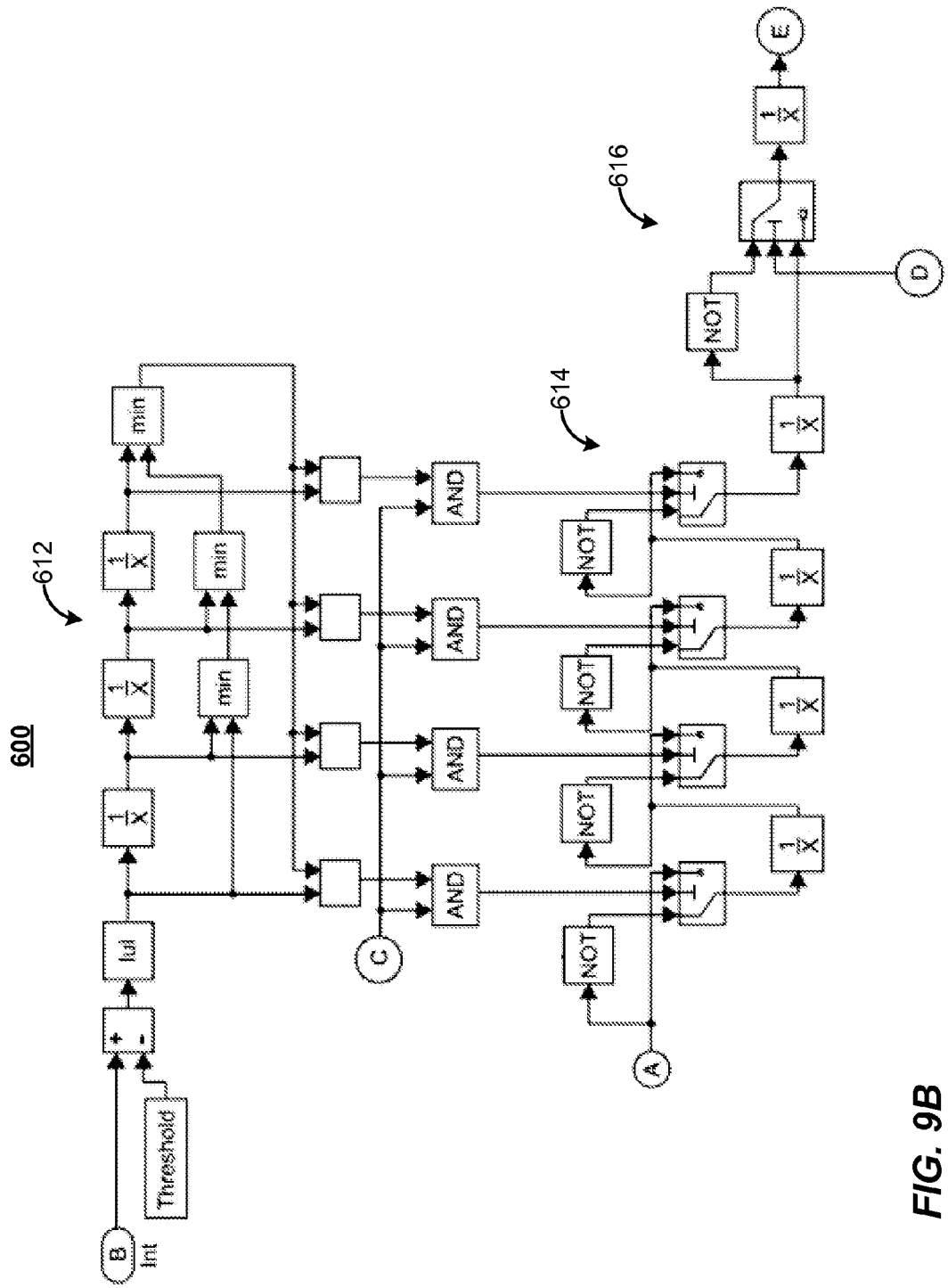
Figure 9C:
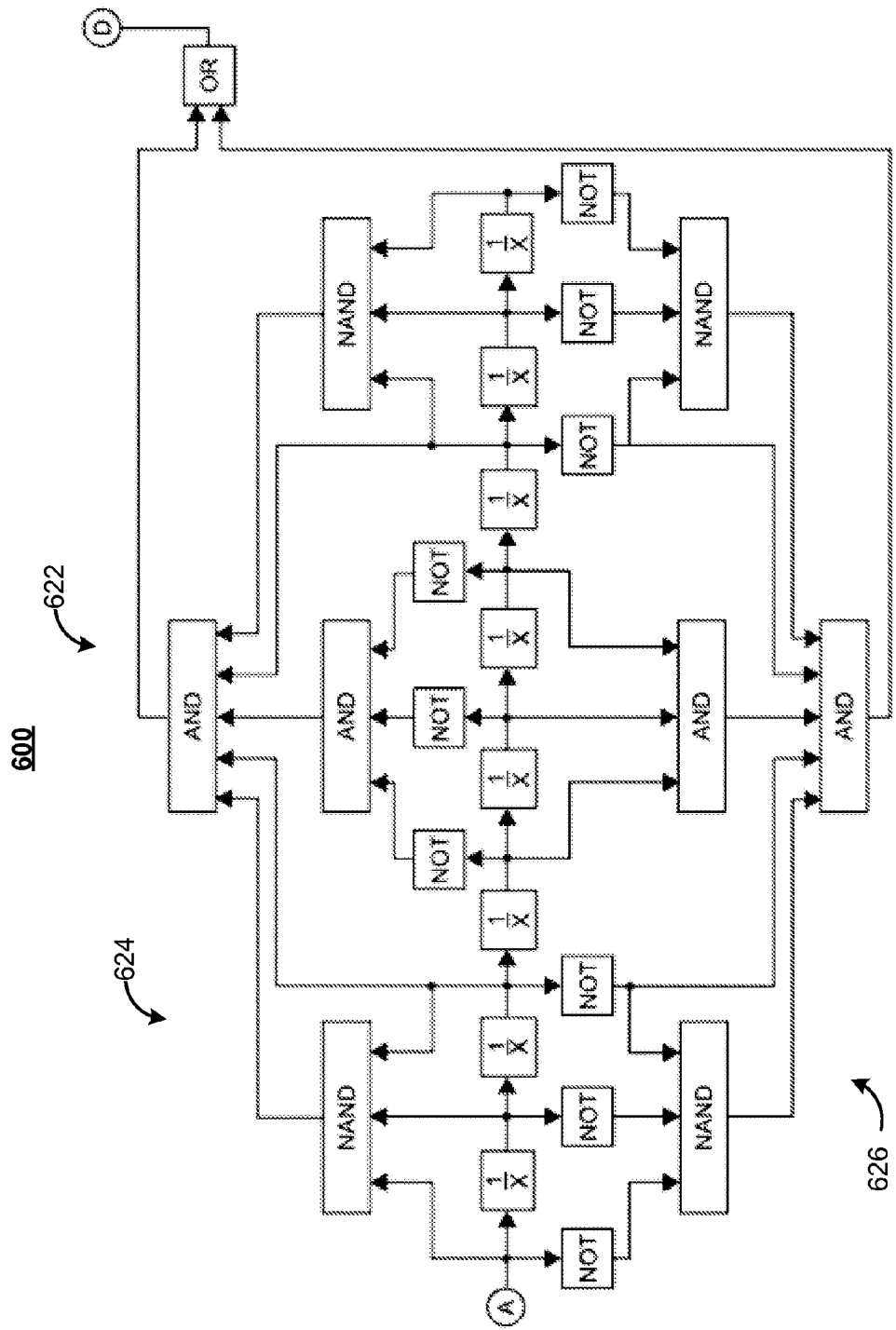

FIGS. 9A-9C illustrate respective portions of an example circuit 600 that implements bit flipping functionality of the pattern correction module 540, according to an embodiment. In an embodiment, the circuit 600 receives, at an input indicated FIGS. 9A-9C as a point A, the output of the comparator 534 and detects sub-sequences of three or more consecutive bits having a same values (e.g., logic zero or logic one). In response to detecting a sub-sequence of three consecutive bits having a same value, the circuit 600 flips the middle bit in the detected sub-sequence of bits. In response to detecting a subsequence of consecutive four or more bits having a same value, the circuit 600 flips the least reliable bit in the detected sub-sequence of bits. To this end, the circuit 600 receives, at an input indicated in FIG. 9B as a point B, the output of the integrate and dump filter 530, and compares the output of the of the integrated and dump filter 530 corresponding to each bit of the detected sub-sequence of bits to a threshold value.

The circuit 600 includes a sub-circuit 602 illustrated in FIG. 9A, sub-circuits 612, 614, 616 illustrated in FIG. 9B, and a sub-circuit 622 illustrated in FIG. 9C. In operation, the sub-circuit 602 receives sequences of bits from the comparator 534 FIG. 7, and detects sub-sequences of four or more consecutive bits corresponding to a same value (e.g., a logic 0 or a logic 1). and the sub-circuit 612 detects the least reliable bit in the detected sub-sequence of bits. To detect the least reliable bit in the detected sub-sequence of bits, the sub-circuit 612 analyzes the output of the integrate and dump filter 530 corresponding to the detected sub-sequence of bits. In particular, the sub-circuit 612 determines, for each bit in the sub-sequence of bits, a difference between the value generated for the bit by integrate and dump filter 530 and a threshold value, which corresponds to the threshold value used by the comparator 534 to determine the value of the bit, in an embodiment. The sub-circuit 614 is controlled by the sub-circuit 612 to flip the bit that corresponds to the minimum difference detected by the sub-circuit 612, in an embodiment.

The output of the comparator 534 is also received by the sub-circuit 622, which is illustrated in FIG. 9C as having an upper portion 624 and a lower portion 626. In general, the circuit 622 is configured to detect, in sequences of received bits, sub-sequences of three consecutive bits that correspond to a same value (e.g., a logic 0 or a logic 1). In particular, the upper portion 624 of the sub-circuit 622 detects sub-sequences of three consecutive zeros in the received bits, and the lower portion 626 of the sub-circuit 622 detects sub-sequences of three consecutive ones in the received bits. The output of the circuit 622, indicated in FIG. 9C as a point C, is provided to the sub-circuit 616 to control operation of the circuit 616. In particular, the output D of the sub-circuit 622 controls the sub-circuit 616 to flip the middle bit in the sequence of three consecutive bits detected by the sub-circuit 622 to correspond to a same value.

As just an example, the upper portion 624 of the sub-circuit 622 detects sub-sequences of three consecutive zeros in the following example sequences of bits: X01000101, 0X100010X, 0X10001X0, X010001X0, wherein X can be either a zero or a one, and wherein the detected sub-sequences of three consecutive zeros are underlined. The sub-circuit 616 flips the middle bit, thereby generating X01010101, 0X101010X, 0X10101X0, X010101X0, respectively, for the example sequences given above, wherein the flipped bit is underlined. Similarly, the upper portion 624 of the sub-circuit 622 detects sub-sequences of three consecutive ones in the following example sequences of bits: X1011101X/1X011101X/1X01110X1/X101110X1, wherein X can be either a zero or a one, and wherein the detected sub-sequences of three consecutive ones are underlined. The sub-circuit 616 flips the middle bit, thereby generating X1010101X/1X010101X/1X01010X1/X101010X1, respectively, for the example sequences given above, wherein the flipped bit is underlined.

Figure 10A:
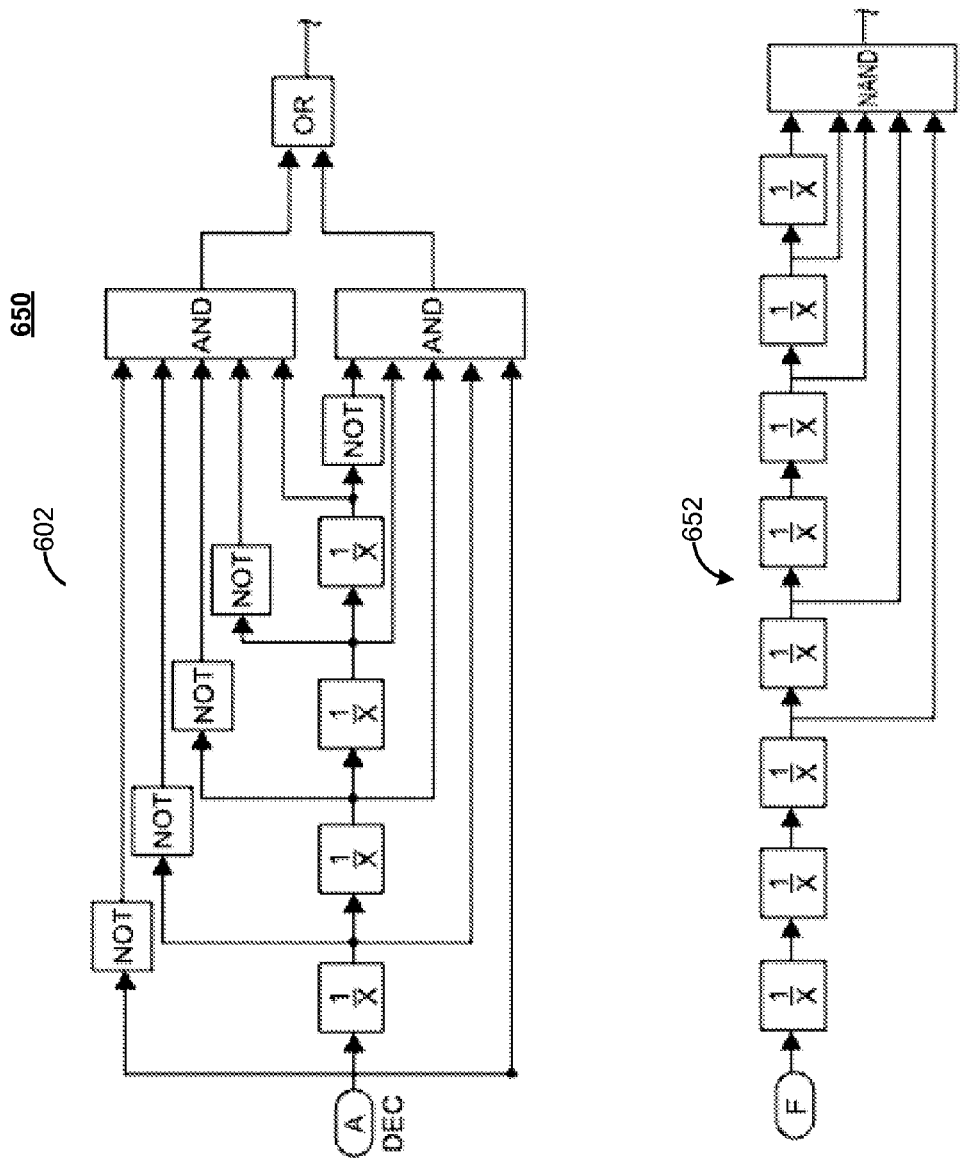
FIGS. 10A-10C illustrate respective portions of another example circuit that implements bit flipping functionality of a pattern correction module, according to another embodiment.
Figure 10B:
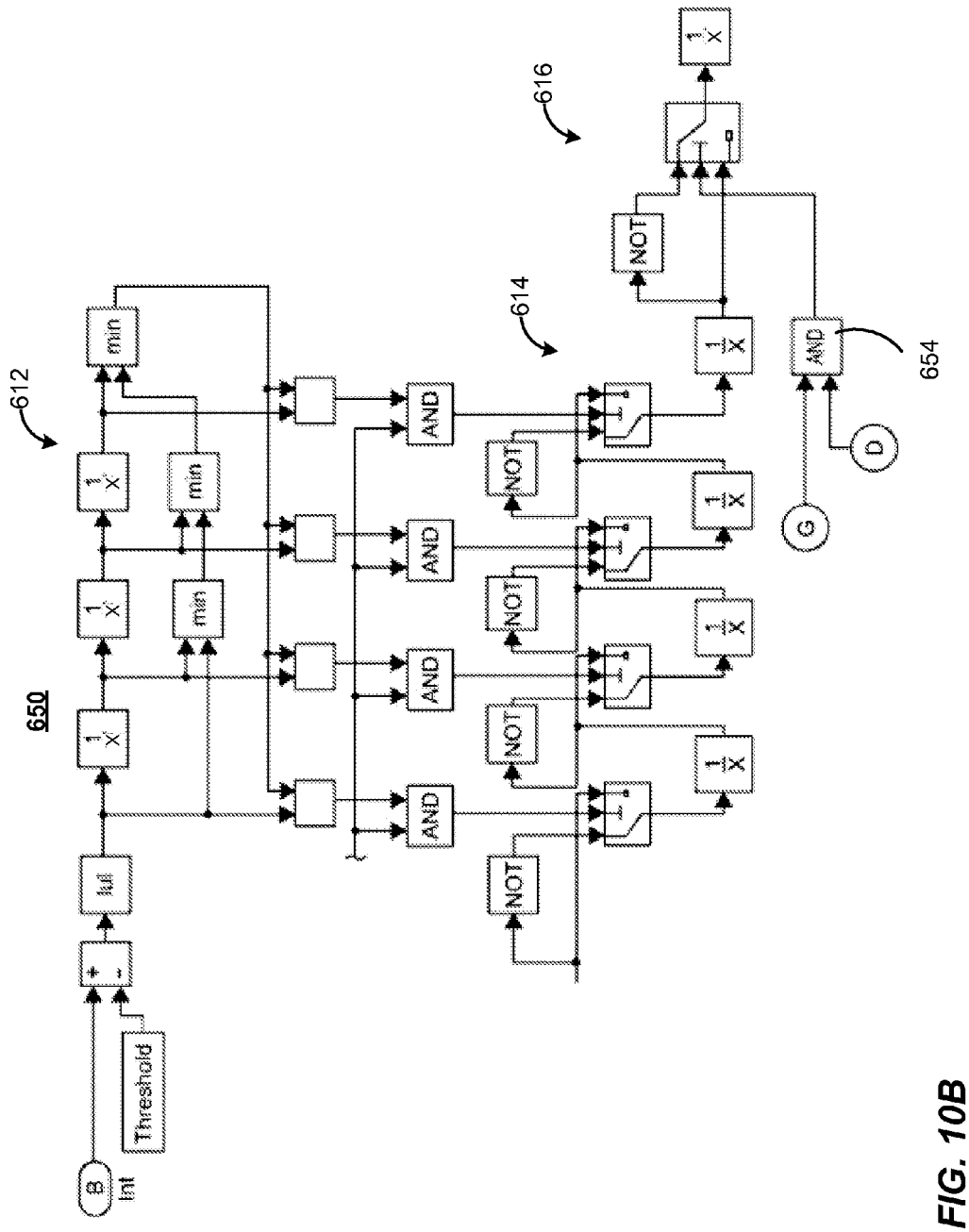
Figure 10C:
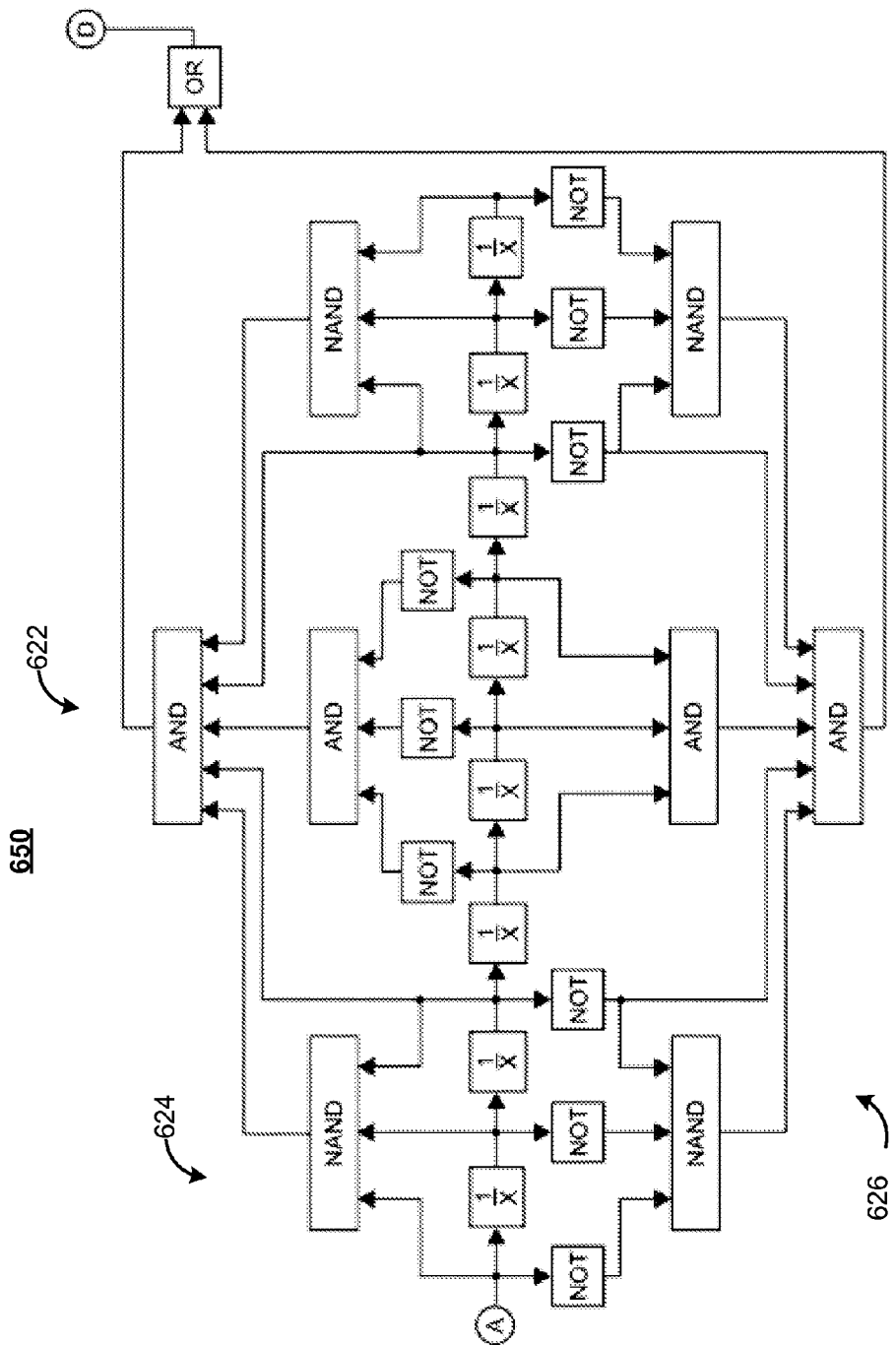

FIGS. 10A-10C illustrate respective portions of an example circuit 650 that implements bit flipping functionality of the pattern correction module 540, according to another embodiment. The circuit 650 is similar to the circuit 600 of FIGS. 9A-9C and includes same-numbered elements which are not discussed for the purpose of conciseness. Additionally, the circuit 700 includes a sub-circuit 652 and a logical conjunction (AND) element 654. The sub-circuit 652 receive the "sync-found" from the AND gate 524, and when the sync-fund signal indicates that a sync pattern has been detected in the sequence of bits being analyzed by the circuit 650, the sub-circuit 652 operates to prevent flipping of the middle bit in the sequence of three consecutive zeros or three consecutive ones in the sequence, thereby protecting the sync pattern. In effect, the sub-circuit 652 and the AND element 654 operate to override the output D of the circuit 622 to ensure that the middle bit in a sub-sequence detected by the circuit 622 is not flipped when the detected sub-sequence corresponds to a sync pattern, in an embodiment.

Figure 11:
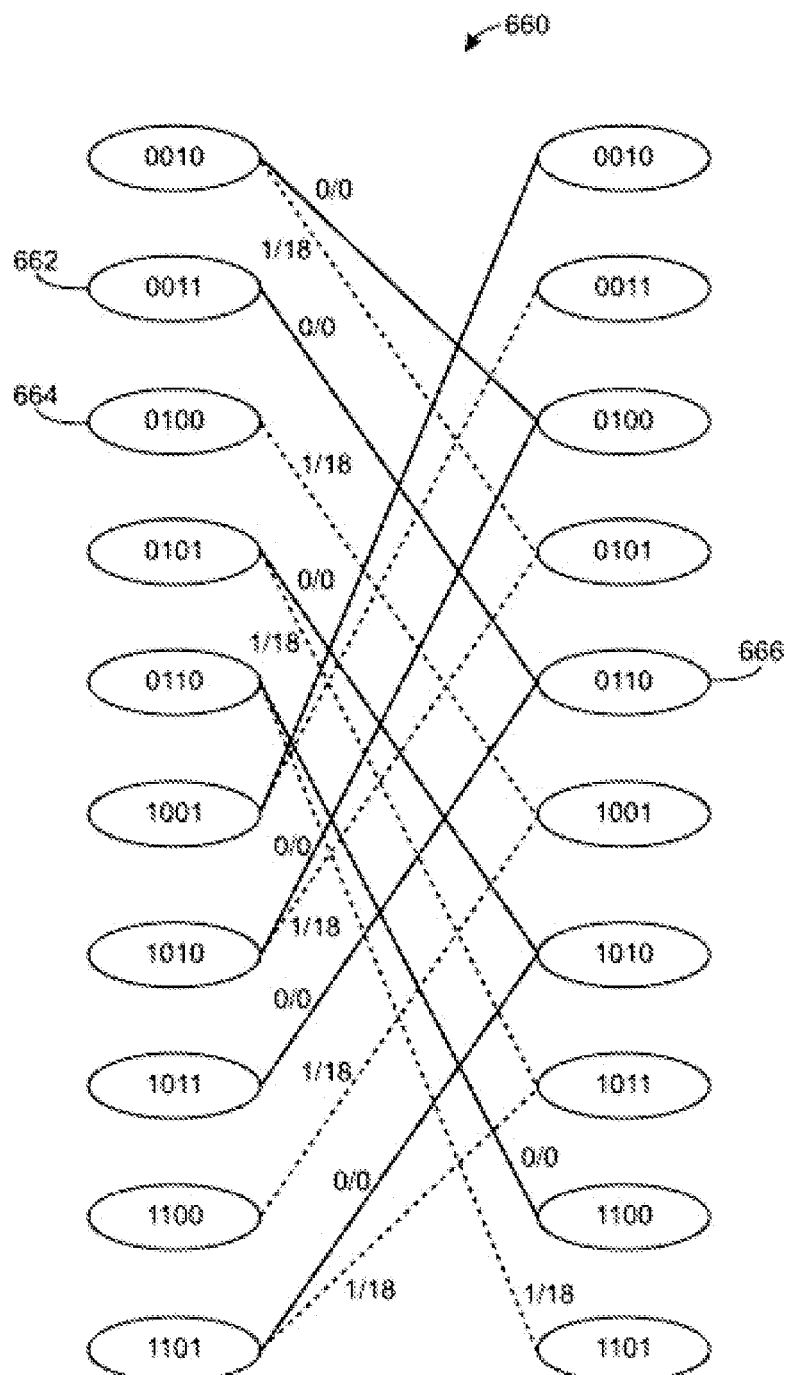
FIG. 11 is an example state machine employed by a pattern correction module of a timing recovery and decoding system, according to an embodiment.

As an alternative to employing bit flipping as described above, in another embodiment, the pattern correction module 540 implements a trellis decoding technique, such as the Viterbi algorithm to automatically correct sequences that violate the bi-phase modulation constraint. In this embodiment, the pattern correction module 540 determines the most likely bit sequence in the bi-phase modulation portion of the HFM signal based on the observed bit sequence using a finite state machine designed to ensure that the output of the pattern correction module 540 does not violate the bi-phase modulation constraint. FIG. 11 is an example state machine 660 implemented by the pattern correction module 540, according to an embodiment. Generally speaking any suitable finite state machine can be utilized by the pattern correction module 540 to process sequences of bits entering the pattern correction module 540 and to correct those sequences that violate the bi-phase modulation constraint to ensure that sequences of bits at the output of the module 540 do not violate the bi-phase modulation constraint. In the example implementation depicted in FIG. 11, the trellis algorithm employs ten states. To determine the most likely actual bits based on observed detected channel bits, in an embodiment, the pattern correction module 540 calculates a branch metric for each allowed branch for the current state corresponding to the sequence of the received bits. In an embodiment, the pattern correction module 540 calculates a branch metric for each allowed branch for the current state according to $|x-0|$ and $|x-18|$, wherein x corresponds to the current state. Based on the branch metric for each allowed branch for the current state, the pattern correction module 540 calculates a path metric based on the branch metric for each allowed branch for the state, and selects the branch having the minimum distance according to $$\min(PM(0)+|x-0|, PM(1)+|x-18|)) \qquad \text{Equation 1}$$

In an embodiment, the state machine 660 is designed such that states and/or state transitions that violate the bi-phase modulation constraint are not allowed in the state machine. In particular, because the bi-phase modulation compliant bit patterns include at most two consecutive bits corresponding to a same value, states that already include two consecutive bits of a same value in the state machine 660 allow only one branch leading to a sequence of bits in which the two consecutive bits having the same value are not followed by another bit of the same value. As a result, the state machine 660 does not allow decisions that result in a sequence of more than two bits corresponding to a same value. As an example, the state machine 660 includes a state 662 corresponding to the sequence "0011." Because this sequence includes two consecutive ones at the end of the sequence, the next bit in the sequence cannot be a "1" because this condition would violate the bi-phase modulation constraint. Accordingly, as illustrated in FIG. 11, the state machine 660 defines only one allowed branch 664 for the state 662, leading to a state 666 corresponding to the sequence "0110," which does not violate the bi-phase modulation constraint. A state transition to a sequence "0111" would violate the bi-phase modulation constraint, and, accordingly, the state machine 660 does not allow this state transition, in an embodiment.

Figure 12:
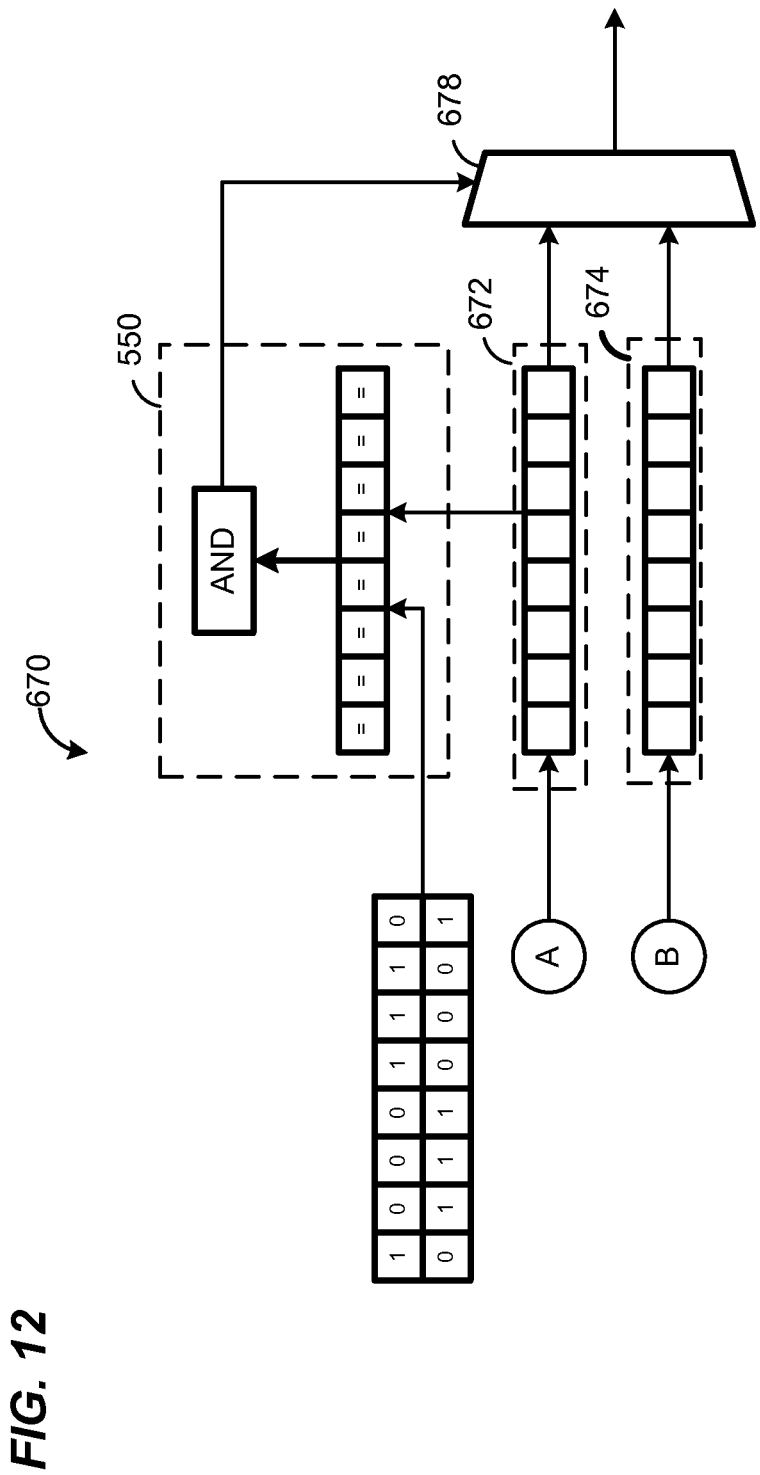
FIG. 12 is a schematic diagram of a detection output selection unit, according to an embodiment.

In an embodiment, selection of the output of the system 500 includes detecting a pattern of the readback signal and determining whether the detected pattern corresponds to the sync body portion of the signal. For example, in an embodiment in which the pattern correction module 540 employs a trellis based state machine, such as the state machine 660 of FIG. 11, to detect and correct patterns in the readback signal that violate bi-phase modulation constraint, the pattern correction module 540 is not able to automatically detect a sync body pattern in the readback signal because the sync body pattern violates the bi-phase modulation constraint. Accordingly, in an embodiment, an output selection unit is utilized to detect the sync body pattern in the readback signal, and to select the output 539, rather than the output 545, as the output of the system 500 during the sync body portion of the readback signal. An example output selection unit 670 according to one such embodiment is schematically depicted in FIG. 12. It should be noted that a selection unit, such as the selection unit 670, need not be used in embodiments in which the pattern correction 540 employs bit-flipping, rather than trellis-based pattern correction (e.g., as discussed above with respect to FIGS. 9A-9C and FIGS. 10A-10C), because in such embodiments the pattern correction module 540 is able to automatically detect a sync pattern, as discussed above. Accordingly, the selection unit 670 is omitted, in at least some such embodiments.

Referring to FIG. 12, the selection unit 670 includes a first buffer 672, a second buffer 674, a comparator unit 550 and a multiplexer (MUX) 678. The first buffer 672 buffers a sequence of bits corresponding to the output 539 of the XOR element 538, and the second buffer 674 buffers a sequence of bits corresponding to the output 545 of the XOR element 544. The output of the first buffer 672 is provided as a first input into the MUX 678 and the output of the second buffer 674 is provided as a second input to the MUX 678. The MUX 522 is used to select either the sequence of bits buffered in the first buffer 672 or the sequence of bits buffered in the second buffer 674 as the detection output of the system 500, in an embodiment.

According to an embodiment, the bit sequence corresponding to the output 539 has not been processed by the pattern detection and correction unit 540 and this sequence, therefore, can be used to detect the sync body pattern even in embodiments in which the pattern detection and correction unit 540 employs a trellis based state machine, such as the state machine 660 of FIG. 11, to ensure that the bit sequence at the output 545 does not violate the bi-phase modulation constraint. In an embodiment, the comparator unit 550 compares the bit sequence in the first buffer 672 to each one of the two possible sync body patterns (i.e., "10001110" and "01110001"), and when the bit sequence matches a sync body pattern, outputs a one (1) or another indication that the bit sequence corresponds to the sync body pattern. On the other hand, when the bit sequence does not match a sync body pattern, the comparator unit 550 outputs a zero (0), or another indication that the bit sequence does not correspond to the sync body pattern. The output of the comparator unit 550 is provided to the MUX 678 to control the state of the MUX 678. In particular, when the output of the comparator unit 550 indicates that the sequence of bits stored in the first buffer 672 corresponds to the sync body bit pattern, then the MUX 678 is controlled to select the sequence stored in the first buffer 672 as the detection output of the system 500. On the other hand, when the output of the comparator unit 550 indicates that the sequence of bits stored in the first buffer 672 does not correspond to the sync body bit pattern, then the MUX 678 is controlled to select the sequence stored in the second buffer 674 as the detection output of the system 500.

Figure 13A:
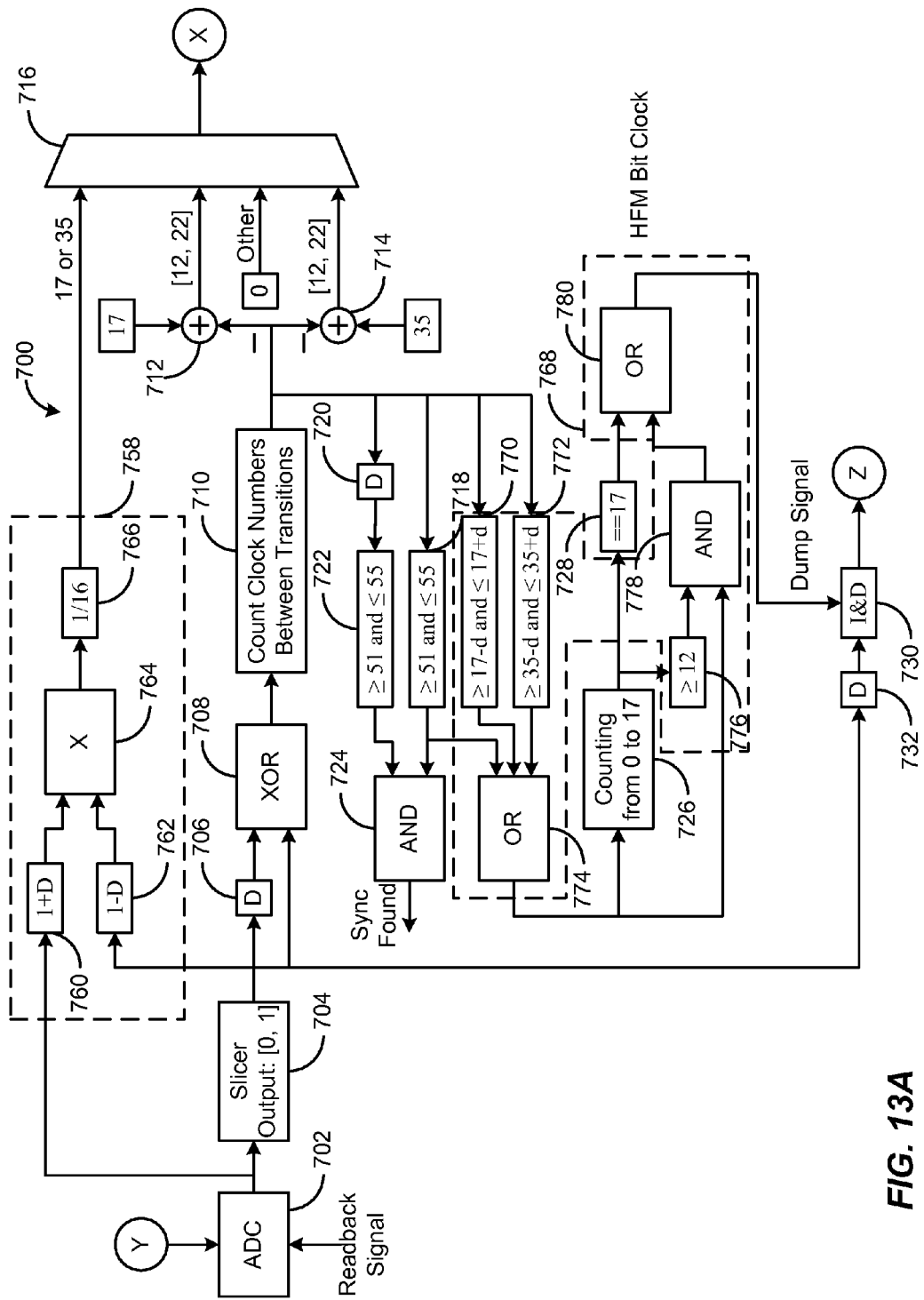
FIGS. 13A-13C are block diagrams of various components of an alternative example timing recovery and decoder system that implements timing recovering of the high frequency modulation signal to identify a timing error in recovering the HFM signal, according to an embodiment.
Figure 13B:
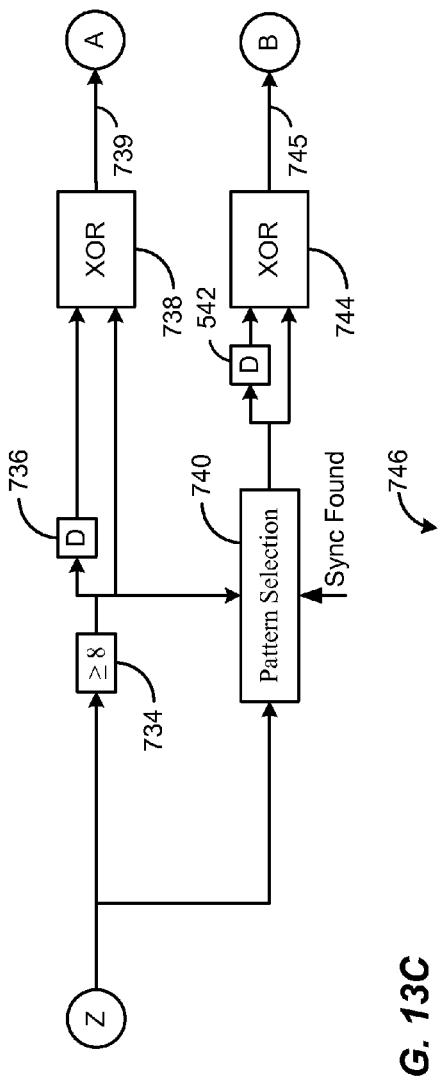
Figure 13C:
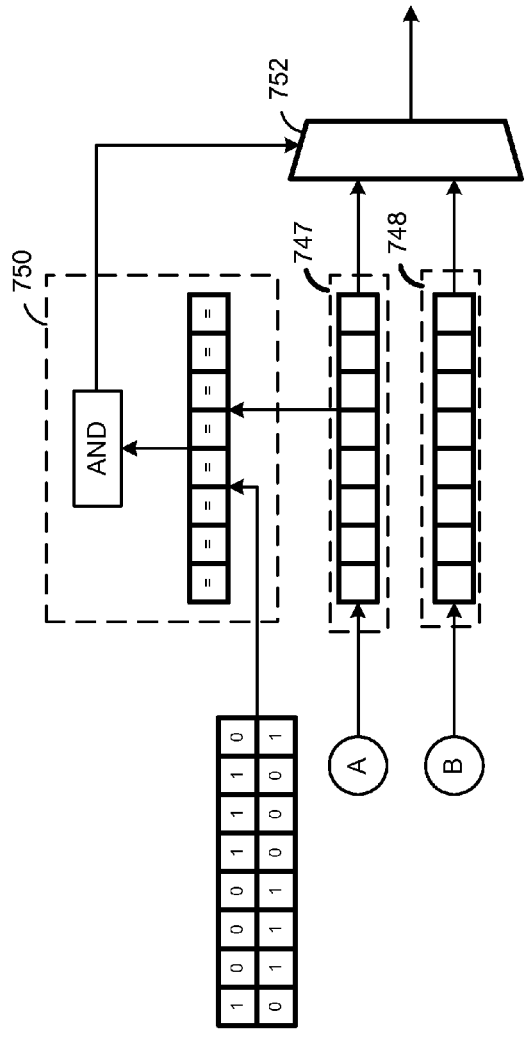

FIGS. 13A-13C illustrate another example of a timing recovery and decoder system 700, according to another embodiment. The system 700 includes many of the same elements as disclosed and described with respect to the system 500 of FIG. 7, with similar elements having numerical references of 702-745 corresponding with references 502-545 in FIG. 7, respectively. Accordingly, further description of these elements need not be provided. For example, the system 700 includes a timing recovery assembly including a delay element 706, an XOR element 708, a counter 710, adders 712, 714 and a MUX 716. This example of the timing recovery and decoder system further recovers the synchronization pattern in the HFM signal using an output from a counter 710 and a synchronization assembly including first and second range elements 718, 722, a delay element 720 and an AND element 724. Still further, the exemplary timing recovery and decoder system is able to decode the HFM signal using a decoder assembly which is triggered by the synchronization assembly and includes a counter 726, comparator 728, and integrate and dump filter 730. Referring briefly to FIG. 13B, the output of the integrate and dump filter 730 is provided to a comparator 734 and to a pattern correction module 740. The output of the comparator 734 is provided to a delay element 732 and XOR element 738 which generates a first detection output 739 of the system 700, and the output of the pattern correction module 740 is provided to a delay element 742 and an XOR element 744 which generate a second detection output 745 of the system 700. Referring now to FIG. 13C, the exemplary system 700 also includes a section unit 746 which includes a first buffer 747, a second buffer 748, a comparator unit 750 and a MUX 752 and which is configured to select wither the first detection output 739 or the second detection output 745 as the output of the system 700, in an embodiment.

In addition, the timing recovery and decoder system 700 includes a multiplier assembly 758 and a counter reset assembly 768. The multiplier assembly 758 is provided as an alternative technique for resolving a phase error. The timing loop of FIG. 8 uses the phase error to generate clock information corresponding to the clock timing from the bi-phase modulated portion of the HFM signal. In particular, the timing recovery assembly of FIG. 7 resolves the phase error to within one HFM bit. That is, the recovery assembly of FIG. 7 attempts to correct the timing only if the expected clock count has drifted more than +/− one HFM bit (i.e., in multiples of T). In the event this resolution is still too coarse such that better resolution is desired, the multiplication assembly 758 is configured to resolve the phase error more quickly and more efficiently. For example, if the frequency offset is relatively small, the phase error will be spaced far apart, and the cumulative phase error is greater than T, in at least some situations. Accordingly, more frequent, finer phase error resolution may be desired.

The multiplication assembly 758 utilizes the zero crossing (transitions) of the output from the ADC 702, that is, when the measured distances between signal transitions is exactly 18T (17 clock counts) or 36T (35 clock counts), to generate the phase error. In particular, the multiplication assembly multiplies the sampled output of the readback signal from the ADC 702 with the sign of the signal transition from the output of the slicer 704. The sign of the signal transition is an indication of whether the sinusoidal output from the ADC 702 is a rising edge or a falling edge. Similar to the slicer 504 disclosed above with respect to FIG. 7, the slicer 704 converts the sinusoidal output from the ADC into outputs of "0" or a "1" for each sample, where the "0" corresponds to a low level in the waveform of the readback signal, and the "1" corresponds to a high level, in an embodiment. It is noted, however, that the slicer of either one or both FIG. 7 and FIGS. 14A-14B can output a "−1" instead of a "0", if desired.

The output of the ADC 702 is provided to a 1+D delay element 760 and the output of the slicer 704 is provided to a 1−D delay element 762, where 1−D of the slicer output is the sign of the signal transition (i.e., rising or falling) if there is any signal transition occurring. The "D" refers to the delay, which is set at one sample delay, according to an embodiment. As such, 1+D refers to the current sample delay plus the previous sample delay, and 1−D refers to the current sample delay minus the previous sample delay. For example, if the output from the slicer 704 is " . . . , 0, 0, 0, 1, 1, 0, 0, . . . ", then the output from the 1−D delay element would be " . . . 0, 0, 1, 0, −1, 0, . . . " where the previous sample is subtracted from the current sample (e.g., 0−0=0, 0−0=0, 1−0=1, 1−1=0, 0−1=−1, 0−0=0).

In this example, the delay factor, D, of the delay elements 760, 762 is set to T. If a signal transition is on a rising edge, then the output of the 1−D delay element 762 is a positive one (+1), and if a signal transition is on a falling edge, then the output of the 1−D delay element 762 is negative one (−1). The outputs of the delay elements are provided to a multiplier 764, which ensures that the phase error maintains the correct sign. The output of the multiplier 764 is multiplied by a coefficient 766 (e.g. 1/16), in an embodiment. In an embodiment, the coefficient 766 is programmable and can be used to adjust the gain of the overall timing loop.

The output of the multiplier assembly 758 is used as the timing error when the range determination assembly generates a zero, in an embodiment. For example, as disclosed above with respect to FIG. 7, the range determination assembly determines whether the actual clock count falls within a range corresponding to an 18T transition, within a range corresponding to a 36T transition, or neither. In the event the actual clock count corresponds with the expected clock count (i.e., the output from adder 712 or adder 714 is zero), the MUX 716 selects the input from the multiplication assembly. As such, if the drift in the expected clock is smaller than one HFM bit, then the system is still able to generate a phase error for the timing loop of FIG. 8.

As previously indicated, in at least some embodiments, the timing recovery and decoder system 700 is also be used, in part, to decode the HFM signal using a counter reset assembly 768. As disclosed with respect to FIG. 7, an integrate and dump filter utilizes an HFM bit clock generated by comparing a counter 526 output to a constant as set at an HFM bit clock element 528, where the HFM bit clock is a dump signal generated every 17 clocks. As also disclosed, the counter 526 is reset between detection of the sync patterns. Between sync pattern detections, the counter 526 is otherwise free running, such that if there is little way to correct the counter 526 if it is wrong. For example, a small frequency offset from the clock may produce errors in decoding the signal. As a result, it is possible for the dump signal to gradually misalign with the data boundary, and if the data boundary is incorrect, the HFM data bit may be incorrect.

In order to correct for this potential dump signal drift, rather than utilizing the detection of the sync pattern, the timing recover and decoder system 700 utilizes the counter reset assembly 768 to reset the counter 726 at every detected signal transition from the slicer 704. In this example, the counter reset assembly 768 includes a third range element 770, a fourth range element 772, and an inclusive disjunction element, such as an inclusive-or circuit (OR) element 770. The counter reset assembly 768 further includes a comparator 776, a logical conjunction (AND) element 778 and a second inclusive-or circuit (OR) element 780. The comparators 776 outputs a "1" if the logical comparison is "true" and output a "0" if the comparison if false, in an embodiment. The range elements 770, 750 are implemented similar to those disclosed with respect to range elements 718, 720, in an example embodiment.

Generally, the counter reset assembly 768 receives the clock counts from the counter 710, which are input to the first range element 718, the third range element 770 and the fourth range element 772. In one example, each of the range elements 770, 772 is provided as comparators and an AND element, where, in the case of the third range element 770, a first comparator compares the inputted actual clock count to 17−d (or other desired lower range parameter) and a second comparator compares the inputted actual clock count to 17+d (or other higher range parameter). Likewise, the range element 772 includes a first comparator that compares the inputted actual clock count to 35−d (or other desired lower range parameter) and a second comparator compares the inputted actual clock count to 35+d (or other higher range parameter), in an embodiment. In an embodiment, the value of the variable d is determined or selected for an appropriate range for triggering a reset of the counter 726, as will be described in more detail below.

In an embodiment, the first, third and fourth range elements 718, 770, 772 determine whether the respective actual clock count from the counter 710 falls within one of predetermined ranges, such as [51, 55], [12, 22] or [25, 45], respectively, for example. If so, the output of the respective range element 718, 770, 772 is provided as a "1" or other indication that the actual clock count corresponds to a 54T, 18T or 36T transition, respectively, in an embodiment. If the difference is greater than the parameters of the respective range elements, then the output of the range element 718, 770 or 772 is provided as a "0" or other indication that the actual clock count does not correspond to a 54T, 18T or 36T signal transition, respectively. If consecutive actual clock counts each correspond to a 54T, 18T or 36T transition as determined by one of the respective range elements 718, 770, 772, then the outputs of the corresponding range element (e.g., "1") triggers an indication that a signal transition has occurred, including one that may have occurred in the sync pattern. In the example shown in FIG. 13A, the outputs are provided to the OR element 780, which outputs a "1" as the indication that a 54T, 18T or 36T signal transition has occurred.

In some embodiments, tighter parameters for the range elements 770 and/or 772 than the example parameters discussed above are utilized. Tighter parameters of the range element 770 and/or 772 allow the range elements 770 and/or 772 to better filter the readback signal and to avoid false triggers of the I&D 730, in at least some embodiments and/or scenarios. In an embodiment, the parameters of the range elements 748, 750 are set according to the value of a selectable (e.g., programmable) variable, d. In an embodiment, the value of the variable d is set using two bits (e.g., a two bit register), or using another suitable number of bits. In an embodiment, a two bit value of "00" corresponds to parameters of the range elements 770, 772 set to [17, 17] and [35, 35], respectively. A value of "01" corresponds to parameters of the range elements 770, 772 set to [16, 18] and [34, 36], respectively, in this embodiment. A value of "10" corresponds to parameters of the range elements 770, 772 set to [14, 20] and [32, 38], respectively, in this embodiment. A value of "11" corresponds parameters of the range elements 770, 772 set to [12, 22] and [25, 45], respectively, in this embodiment.

Alternatively or in addition to utilizing tighter and/or selectable ranges in the range elements 770, 772 to improve triggering of the I&D element 730, tighter and/or selectable ranges are used for the corresponding ranges in MUX 716. For example, MUX 716 checks whether the output of the adder 12 corresponds to exactly 18 clock counts (i.e., range of 0), or is within a range that is tighter than between 12 clock counts and 22 clock counts, in an embodiment. Similarly, MUX 716 checks whether the output of the adder 714 corresponds to exactly 36 clock counts, or falls within a range that is tighter than between 25 clock cycles and 35 clock cycles, in an embodiment. A tighter tolerance in the MUX 716 results in filtering of the clock provided to the ADC 702, thereby reducing spurious noise in the transition clock counts provided to the range elements 770, 772. Accordingly, less tight parameters can be used for the range elements 770, 772 and the parameters need not be selectable for the range elements 770, 772, in at least some such embodiments.

In any event, the output from the OR element 774 is provided to the counter 726 as well as the AND element 778. When a "1," or other indication that a signal transition has been found, is provided to the counter 726, the counter 726 is reset and begins counting from 0 to 17, which corresponds to the channel bits of 18T, and count according to the expected clock count, T. The output of the counter 726 is provided to both an HFM bit clock element 728 and a comparator 776. Based on the output from the counter 726, the comparator 776, or other comparable element, determines whether the count from the counter 726 is greater than or equal to some threshold, for example, 12. This avoids pulses being generated too close to each other in the HFM bit clock. If the count from the counter 726 is greater than or equal this threshold, the comparator outputs a "1" to the AND element 778. As a result, when the counter 726 is being reset, an HFM bit clock pulse is generated only when the counter output is large enough.

Once a count of 17 has been reached or if a signal transition is detected within the set range of clock counts of the last counter reset, then the HFM bit clock is set at the OR element 780 and provided as a dump signal to the integrate and dump filter 730 of the decoding assembly. By resetting the counter 726 at every detected signal transition, the resulting HFM bit clock aligns with the true data boundary, and the dump signal is generated at the correct location in the signal being decoded. As such, the correct HFM bit is ensured even with a small frequency offset, such that there is an improved tolerance for timing errors, in at least some embodiments.

Figure 14:
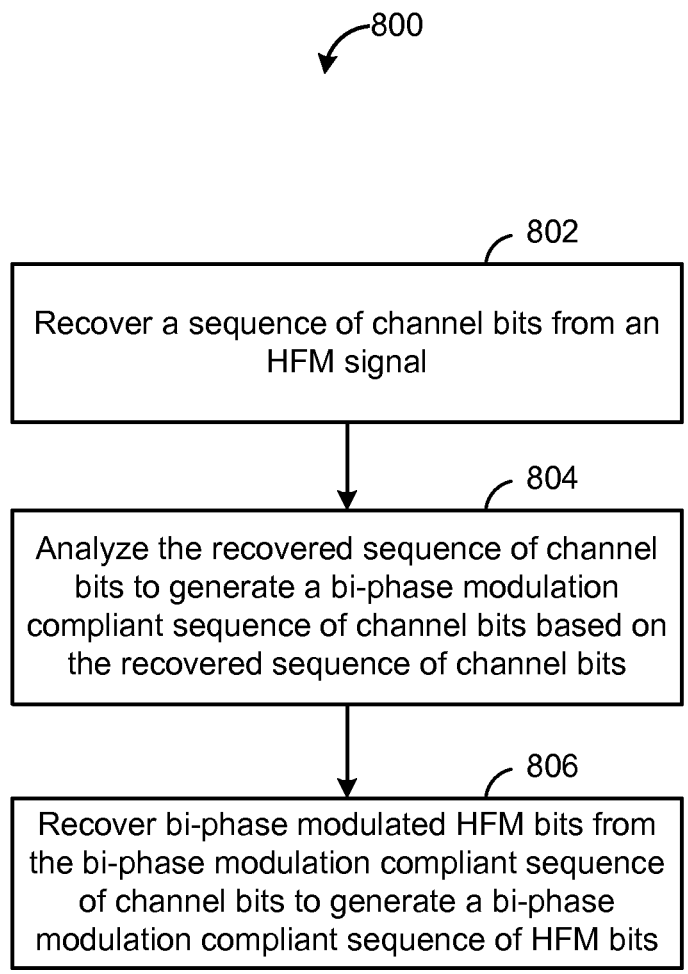
FIG. 14 is a flow chart of an example method of correcting a channel bit pattern that violates bi-phase modulation constraint in a bi-phase modulated portion of a high frequency modulation (HFM) signal, according to an embodiment.

FIG. 14 is a flow chart of an example method 800 of correcting a channel bit pattern that violates bi-phase modulation constraint in a bi-phase modulated portion of a high frequency modulation (HFM) signal, according to an embodiment. With reference to FIG. 1, the method 400 is implemented at least partially by the signal processing and/or control unit 12, in an embodiment. Referring to FIG. 7, the method 400 is implemented by the system 500. Referring to FIGS. 13A-13C, the method 400 is implemented by the system 700, in another embodiment. In other embodiment, the method 400 is implemented by other suitable systems.

At 802, a sequence of channel bits is recovered from an HFM signal read back from an optical disc. For example, the I&D element 530 of FIG. 7 or the I&D element 730 of FIG. 13A integrates and dumps samples from the readback signal to recover the sequence of channel bits at 802, in an embodiment. In other embodiments, the sequence of channel bits is recovered at 802 in other suitable manners.

At 804, the recovered sequence of channel bits is analyzed to generate a bi-phase modulation compliant sequence of channel bits. For example, the pattern correction module 540 of FIG. 5 or the pattern correction module 740 of FIG. 13B analyzes the recovered sequence of channel bits to generate a bi-phase modulation compliant sequence of channel bits. The bi-phase compliant sequence of channel bits generated at 804 does not violate the bi-phase modulation constraint discussed above, in an embodiment. In particular, the bi-phase compliant sequence of channel bits generated at 804 does not include a sub-sequence of more than two bits corresponding to a same value (e.g., low or high), in an embodiment. In an embodiment, bit flipping as discussed above with respect to FIG. 6B is utilized to generate the bi-phase modulation compliant sequence of channel bits. In another embodiment, a Viterbi algorithm such as discussed above with respect to FIG. 11 is utilized to generate the bi-phase modulation compliant sequence of channel bits. In other embodiments, other suitable techniques for generating a bi-phase modulation compliant sequence of bits based on a sequence of recovered channel bits are utilized.

At 806, bi-phase modulated bits are recovered from the bi-phase modulation compliant sequence of bits generated at 804. Generally speaking, generating the bi-phase modulation compliant sequence of channel bits at 804 allows for more accurate detection of bi-phase modulated bits, in at least some embodiments and/or scenarios.

As previously indicated, the above-described timing recovery and decoder systems are provided as examples only, and those of ordinary skill in the art may replace, add, remove or modify elements within the systems as desired without departing from the teachings of the techniques and functionality that have been described herein. It will also be recognized that the various aspects of the timing recovery and decoder systems may be provided separately or in different combinations (e.g., decoder assembly separate from the timing recovery assembly and synchronization assembly, timing recovery assembly separate from the synchronization assembly and decoder assembly, etc.).

As least some of the various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

Moreover, while the HFM detection and timing recovery technique has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
   determining a plurality of time periods corresponding to times at which a predicted transition in a signal is expected to occur, wherein
   the signal has bi-phase modulation, and
   the predicted transition corresponds to a transition in the signal from a first state to a second state as part of the bi-phase modulation;
   detecting a next transition in the signal from the first state to the second state;
   determining whether the detected next transition occurred during one of the plurality of time periods; and
   in response to determining that the detected next transition occurred during one of the plurality of time periods, using a timing of the detected next transition to adjust a clock used for recovering channel bits in the signal.

2. The method of claim 1, wherein:
   the plurality of time periods is a plurality of first time periods;
   the predicted transition is a first predicted transition;
   the method further comprising:
      determining a second time period corresponding to a time at which a second predicted transition in the signal is expected to occur, the second predicted transition corresponding to a timing of a sync pattern in the signal;
      determining whether the detected next transition occurred during the second time period;
      in response to determining that the detected next transition occurred during the second time period, determine that the detected next transition corresponds to the sync pattern, and synchronize timing of a bit recovery system to the sync pattern.

3. The method of claim 2, further comprising:
   running a counter; and
   determining a count of the counter corresponding to the detected next transition;
   wherein synchronize timing of the bit recovery system to the sync pattern comprises:
      determining a difference between the count of the counter and an expected count corresponding to the sync pattern, and
      synchronize timing of the bit recovery system using the difference.

4. The method of claim 1, wherein determining the plurality of time periods and determining whether the detected next transition occurred during one of the plurality of time periods comprises:
   running a counter;
   determining a count of the counter corresponding to the detected next transition; and
   comparing the count to a plurality of counter ranges, the plurality of counter ranges corresponding to the times at which the predicted transition in the signal is expected to occur.

5. The method of claim 1, further comprising:
   recovering a sequence of channel bits from the signal using the clock; and
   analyzing the recovered sequence of channel bits to generate a bi-phase modulation compliant sequence of bits based on the recovered sequence of bits, wherein the bi-phase modulation compliant sequence of channel bits.

6. The method of claim 5, wherein:
   analyzing the recovered sequence of channel bits to generate the bi-phase modulation compliant sequence of bits comprises using a trellis decoder.

7. The method of claim 6, wherein the trellis decoder comprises a Viterbi decoder.

8. The method of claim 5, wherein analyzing the recovered sequence to generate the bi-phase modulation compliant sequence of bits comprises:
   determining that a sub-sequence of the recovered sequence violates the bi-phase modulation constraint; and
   flipping one of the bits in the sub-sequence of the recovered bits.

9. The method of claim 8, wherein:
   determining that the sub-sequence of the recovered sequence violates the bi-phase modulation constraint comprises detecting a sequence of three consecutive channel bits corresponding to a same value; and
   flipping one of the bits in the sub-sequence of the recovered bits comprises flipping a middle bit in the sequence of three consecutive channel bits.

10. The method of claim 1, wherein the signal is a readback signal corresponding to a disk drive.

11. An apparatus, comprising:
   a clock generation device configured to generate a clock;
   a bit recovery device configured to process samples of a signal to recover a sequence of channel bits from the signal using the clock, wherein the signal has bi-phase modulation; and
   a timing recovery device configured to
      determine a plurality of time periods corresponding to times at which a predicted transition in the signal is expected to occur, wherein the predicted transition corresponds to a transition in the signal from a first state to a second state as part of the bi-phase modulation, detect a next transition in the signal from the first state to the second state, determine whether the detected next transition occurred during one of the plurality of time periods, and in response to determining that the detected next transition occurred during one of the plurality of time periods, cause the clock generation device to adjust the clock based on a timing of the detected next transition.

12. The apparatus of claim 11, wherein:
the plurality of time periods is a plurality of first time periods;
the predicted transition is a first predicted transition;
the timing recovery device is further configured to
   determine a second time period corresponding to a time at which a second predicted transition in the signal is expected to occur, the second predicted transition corresponding to a timing of a sync pattern in the signal,
   determine whether the detected next transition occurred during the second time period,
   in response to determining that the detected next transition occurred during the second time period,
      determine that the detected next transition corresponds to the sync pattern, and
      synchronize the timing recovery device to the sync pattern.

13. The apparatus of claim 12, wherein:
the timing recovery device includes a counter; and
the timing recovery device is configured to
   determine a count of the counter corresponding to the detected next transition,
   determine a difference between the count of the counter and an expected count corresponding to the sync pattern, and
   synchronize the timing recovery device using the difference.

14. The apparatus of claim 11, wherein:
the timing recovery device includes a counter; and
the timing recovery device is configured to
   determine a count of the counter corresponding to the detected next transition, and
   compare the count to a plurality of counter ranges, the plurality of counter ranges corresponding to the times at which the predicted transition in the signal is expected to occur.

15. The apparatus of claim 11, further comprising:
a demodulator configured to analyze the recovered sequence of channel bits to generate a bi-phase modulation compliant sequence of bits based on the recovered sequence of bits, wherein the bi-phase modulation compliant sequence of channel bits.

16. The apparatus of claim 15, wherein the demodulator comprises a trellis decoder.

17. The apparatus of claim 16, wherein the trellis decoder comprises a Viterbi decoder.

18. The apparatus of claim 15, wherein the demodulator is configured to:
determine that a sub-sequence of the recovered sequence violates the bi-phase modulation constraint; and
flip one of the bits in the sub-sequence of the recovered bits.

19. The apparatus of claim 18, wherein the demodulator is configured to:
detect a sequence of three consecutive channel bits corresponding to a same value; and
flip one of the bits in the sub-sequence of the recovered bits comprises flipping a middle bit in the sequence of three consecutive channel bits.

20. The apparatus of claim 11, wherein the signal is a readback signal corresponding to a disk drive.

* * * * *